United States Patent
Choukroun

(10) Patent No.: US 9,569,890 B2
(45) Date of Patent: Feb. 14, 2017

(54) METHOD AND DEVICE FOR GENERATING A SIMPLIFIED MODEL OF A REAL PAIR OF SPECTACLES

(71) Applicant: FITTINGBOX, Labege (FR)

(72) Inventor: Ariel Choukroun, Toulouse (FR)

(73) Assignee: FITTINGBOX, Labege (FR)

( * ) Notice: Subject to any disclaimer, the term of this patent is extended or adjusted under 35 U.S.C. 154(b) by 0 days.

(21) Appl. No.: 15/132,185

(22) Filed: Apr. 18, 2016

(65) Prior Publication Data

US 2016/0232712 A1 Aug. 11, 2016

Related U.S. Application Data

(62) Division of application No. 14/791,731, filed on Jul. 6, 2015, now Pat. No. 9,317,973, which is a division
(Continued)

(30) Foreign Application Priority Data

Jan. 18, 2010 (FR) .................................... 10 50305

(51) Int. Cl.
*G06T 15/00* (2011.01)
*G06T 17/20* (2006.01)
(Continued)

(52) U.S. Cl.
CPC ......... *G06T 17/205* (2013.01); *G02B 27/0172* (2013.01); *G06K 9/627* (2013.01);
(Continued)

(58) Field of Classification Search
None
See application file for complete search history.

(56) References Cited

U.S. PATENT DOCUMENTS

| | | | |
|---|---|---|---|
| 7,023,454 B1 | 4/2006 | Knight | |
| 2003/0063086 A1* | 4/2003 | Baumberg | .............. G06T 17/20 345/420 |
| 2009/0154794 A1* | 6/2009 | Kim | ........................ G06T 17/20 382/154 |

FOREIGN PATENT DOCUMENTS

WO          01/32074          5/2001

OTHER PUBLICATIONS

Viola P. et al: "Robust Real-Time Face Detection". International Journal of Computer Vision. Dordrecht. NL LNKD-DOI: 10.1023/B:VISI.0000013087.49260.FB. vol. 57. No. 2. Jan. 1, 2004 (Jan. 1, 2004). pp. 137-154. XP888835782.
(Continued)

*Primary Examiner* — Xiao Wu
*Assistant Examiner* — Mohammad H Akhavannik
(74) *Attorney, Agent, or Firm* — Im IP LAW; C. Andrew Im

(57) ABSTRACT

A method and device for generating a simplified geometric model of a real pair of spectacles. The model includes a frame, lenses, and a predefined number of surfaces and normals thereof. An orientation of these normals is taken as an exterior of a convex envelop to the real pair of spectacles. The model is obtained in a phase. A set of shots of the real pair of spectacles to be modeled is produced with different angles-of-view and using different screen backgrounds with and without the real pair of spectacles. The simplified geometric model is constructed, consisting of a predefined number of surfaces and their normal beginning with a non-dense surface mesh and using an optimization algorithm that deforms the model's mesh so that the projections of its silhouette in each of the views best match the silhouettes detected in the images.

10 Claims, 7 Drawing Sheets

Related U.S. Application Data of application No. 13/522,599, filed as application No. PCT/EP2011/050596 on Jan. 18, 2011, now Pat. No. 9,076,209.

(51) Int. Cl.
| | | |
|---|---|---|
| *G06T 7/00* | (2006.01) | |
| *G06T 19/00* | (2011.01) | |
| *G02B 27/01* | (2006.01) | |
| *G06K 9/62* | (2006.01) | |
| *H04N 5/265* | (2006.01) | |
| *G06T 15/04* | (2011.01) | |

(52) U.S. Cl.
CPC ............ *G06T 7/004* (2013.01); *G06T 7/0089* (2013.01); *G06T 15/04* (2013.01); *G06T 19/00* (2013.01); *G06T 19/006* (2013.01); *H04N 5/265* (2013.01); *G02B 2027/0178* (2013.01); *G06T 2207/20116* (2013.01); *G06T 2207/30244* (2013.01)

(56) References Cited

OTHER PUBLICATIONS

Ma Yong et al: "Robust precise eye location under probabilistic framework". Automatic Face and Gesture Recognition, 2004. Proceedings. Sixth IEEE International Conference on, IEEE, Piscataway, NJ, USA. May 17, 2004 (May 17, 2004), pp. 339-344. XP010949456.

Hamouz M. et al: "Face detection by learned affine correspondences". Structural, Syntactic, and Statistical Pattern Recognition, Joint IAPR International Workshops SSPR 2002 and SPR 2002 (Lecture Notes in Computer Science vol. 2396) Springer-Verlag Berlin, Germany, 2002, pp. 566-575. XP002622546.

\* cited by examiner

METHOD AND DEVICE FOR GENERATING A SIMPLIFIED MODEL OF A REAL PAIR OF SPECTACLES

RELATED APPLICATION

This application is a divisional of application Ser. No. 14/791,731 filed Jul. 6, 2015, which is a divisional of application Ser. No. 13/522,599 filed Aug. 27, 2012, now U.S. Pat. No. 9,076,209, which is a §371 application from PCT/EP2011/050596 filed Jan. 18, 2011, which claims priority from French Patent Application No. 10 50305 filed Jan. 18, 2010, each of which is herein incorporated by reference in its entirety.

FIELD OF THE INVENTION

This invention relates to the field of image processing and image synthesis. It relates more specifically to the real-time integration of a virtual object into photographs or videos.

BACKGROUND OF THE INVENTION

The context of the invention is the real-time virtual trying on of an object in the most realistic way possible; typically these objects are a pair of spectacles to be integrated into a photograph or a video representing the face of a person oriented substantially facing the camera.

The growth in Internet sales, a limited stock, or any other reason preventing or hindering the actual trying on of a real object, generate a need for the virtual trying on of this object. Current solutions, based on a virtual reality or augmented reality, are insufficient in the case of spectacles since they lack realism or interactivity. In addition most of the time they require a lot of data and lots of computing time.

OBJECT OF THE INVENTION

The objective of this invention is to propose a method for modeling virtual spectacles representative of real spectacles and a method of integrating in real time these said virtual spectacles into a photograph or a video representing the face of a person, limiting the number of necessary data.

"Integration" means a positioning and realistic rendering of these virtual spectacles on a photo or a video representing a person without spectacles, thus generating a new photo or video equivalent to the photo or video of the individual that would have been obtained by photographing or filming the same person wearing the real spectacles corresponding to these virtual spectacles.

SUMMARY OF THE INVENTION

The invention envisages in the first place a method of creating a real-time photorealistic final image of a virtual object, corresponding to a real object, arranged on an original photo of a person in a realistic orientation linked to the position of said user, characterized in that it comprises the following steps:
  510: detecting the presence of a placement area for the object in an original photo,
  530: determining the position of characteristic points of the placement area for the object in the original photo,
  540: determining the 3D orientation of the face, i.e. the angles $\phi$ and $\psi$ of the camera having taken the photo, relative to the principal plane of the placement area for the object,
  550: selecting the texture to be used for the virtual object, in accordance with the angle-of-view, and generating the view of the virtual object in the 3D ($\phi$, $\psi$)/2D ($\Theta$, s) position in question,
  560: creating a first rendering by establishing a layered rendering in the correct position consistent with the position of the placement area for the object in the original photo,
  570: obtaining the photorealistic rendering by adding overlays, referred to as semantic overlays, so as to obtain the final image.

According to a particular implementation of the method, the object is a pair of spectacles and the placement area is the user's face.

In that case, according to an advantageous implementation, step 510 uses a first boosting algorithm AD1 trained to determine whether the original photo contains a face.

In a particular implementation of the method as described, step 530 consists of:
  determining a similarity $\beta$, to be applied to an original photo, to obtain a face similar to a reference face in magnification and orientation, and
  determining the position of the precise exterior corner A and the precise interior point B for each eye in the face of the original photo.

More specifically, in this case, step 530 advantageously uses an iterative algorithm that makes it possible to refine the value of the similarity $\beta$ and the positions of the characteristic points:
  defining the first parameters of similarity $\beta_0 = (tx_0, ty_0, s_0, \Theta_0)$,
  characterizing the eyes in the original photo 1 of the user, from a predefined set of models of eyes $DB_{models\_eyes}$ and evaluating the scale,
  re-evaluating the parameters of similarity $\beta_1 = (tx_1, ty_1, s_1, \Theta_1)$.

According to a particular implementation of the method, step 530 uses a second boosting algorithm trained with an eyes learning database, comprising a set of positive examples of eyes and a set of negative examples of eyes.

In a particular implementation of the method as described, step 550 consists of:
  1/ determining a simplified geometric model of the real pair of spectacles, said model comprising a predefined number N of surfaces and their normals, taking as the orientation of these normals the exterior of the envelop convex to the real pair of spectacles,
  2/ applying to it, from a predefined set of reference orientations, an orientation closest to angles $\phi$ and $\psi$,
  3/ calculating a texture of the simplified geometric model, positioned in the 3D orientation of the reference orientation closest to angles $\phi$ and $\psi$, using the texture of this reference orientation; this is equivalent to texturing each of the N surfaces of the simplified geometric model while classifying the surface in the current view into three classifications: interior surface of the frame, exterior frame of the frame, lens.

In this case, according to a more particular implementation, the simplified geometric model of a real pair of spectacles, consisting of a frame and lenses, is obtained in a phase 100 in which:
  a set of shots of the real pair of spectacles to be modeled is produced, with different angles-of-view and using different screen backgrounds with and without the real pair of spectacles, the simplified geometric model is constructed, consisting of a number N of surfaces surface$_j$ and their normal $\vec{n}_j$, beginning with a not very dense surface mesh and using an optimization algorithm that deforms the model's mesh so that the projections of its silhouette in each of the views best match the silhouettes detected in the images.

According to an advantageous embodiment, the number N of surfaces of the simplified geometric model is a value close to twenty.

According to a particular implementation of the method, phase 100 also comprises a step 110 consisting of obtaining images of the real pair of spectacles; the lens must match the lens intended for trying on 500, and in this step 110:

the real pair of spectacles is photographed at high resolution according to V different reference orientations Orientation$^i$ and in N light configurations showing the transmission and reflection of the spectacle lens, these reference orientations are selected by discretizing a spectrum of orientations corresponding to possible orientations when spectacles are tried on, V*N high-resolution images of the real pair of spectacles, designated Image-spectacles$^{i,j}$, are obtained.

In this case, according to a particular implementation, the number V of reference orientations is equal to nine, and if an orthogonal reference space with axes x, y, z is defined, where the y-axis corresponds to the vertical axis, $\psi$ to the angle of rotation around the x-axis, $\phi$ to the angle of rotation around the y-axis, the V positions Orientation$^i$ selected are such that the angle $\psi$ substantially takes the respective values $-16°$, $0°$ or $16°$, the angle $\phi$ takes the respective values $-16°$, $0°$ or $16°$.

According to a particular implementation of the method:

the first light configuration respects the colors and materials of the real pair of spectacles, using neutral light conditions; the V high-resolution transmission images Transmission$^i$ created in this light configuration allow the maximum transmission of light through the lenses to be revealed, the second light configuration highlights the geometric characteristics of the real pair of spectacles (4), using conditions of intense reflection; the V high-resolution reflection images Reflection$^i$ obtained in this second light configuration reveal the physical reflection properties of the lens.

According to a particular implementation of the method, phase 100 comprises a step 120 of creating a texture overlay of the frame Frame$^i$, for each of the V reference orientations.

In this case, more specifically in this step 120:

for each of the V reference orientations, the high-resolution reflection image Reflection$^i$ is taken, a binary image is generated with the same resolution as the high-resolution reflection image of the reference orientations; said binary image is called the lens silhouette Lens$^i_{binary}$. In this lens silhouette Lens$^i_{binary}$, the value of the pixel is equal to one if the pixel represents the lenses and zero otherwise.

Even more particularly, the shape of the lenses needed to generate the lens silhouette Lens$^i_{binary}$ is extracted using an active contours algorithm based on the assumption that the frame and the lenses have different transparencies.

According to an advantageous implementation, in step 120:

a lens overlay Lens$^i_{overlay}$ is generated for each of the reference orientations by copying, for each pixel with a value equal to one in the binary overlay of the lens Lens$^i_{binary}$, the information contained in the high-resolution reflection image and assigning zero to the other pixels, this lens overlay Lens$^i_{overlay}$ is a high-definition cropped image of the lens using, for cropping the original high-definition image, the lens silhouette Lens$^i_{binary}$.

the associated high-resolution reflection image Reflection$^i$ is selected for each of the reference orientations, and a binary background image Background$^i_{binary}$ is generated by automatically extracting the background, a binary image is generated from the binary overlay of the frame Frame$^i_{binary}$, by deducting from a neutral image the outline image of the lenses and the outline image of the background, a texture overlay of the frame behind the lens Frame$^i_{behind\_lens}$, with the texture of the frame corresponding to the portion of the frame located behind the lenses, is generated for each of the reference orientations by copying, for each pixel with a value equal to one in the binary lens overlay Lens$^i_{binary}$, the information contained in the high-resolution transmission image Transmission$^i$, and assigning zero to the other pixels, a texture overlay of the frame outside the lens Frame$^i_{exterior\_lens}$ is generated by copying, for each pixel with a value equal to one in the binary frame overlay Frame$^i_{binary}$ the information contained in the high-resolution reflection image, and assigning zero to the other pixels, an overlay of the texture of the frame Frame$^i$ is defined as the sum of the overlay of the texture of the frame behind the lens Frame$^i_{behind\_lens}$ and the overlay of the texture of the frame outside the lens Frame$^i_{exterior\_lens}$.

According to a particular implementation, in step 550, the texture calculation is performed using overlays associated to the reference orientation closest to angles $\phi$ and $\psi$, by the following sub-steps:

inversion of the normals $\vec{n}_j$ of each of the surfaces of the pair of spectacles modeled surface$_j$ and projection of the frame overlay Frame$^i$, limited to the lens space of the reference orientation closest to angles $\phi$ and $\psi$, to obtain a texture overlay of the internal surface of the frame TextureFrame$^i_{surface\_interior}$, that makes it possible to structure the arms of the frame seen through the lens, in a textured reference model, oriented according to the reference orientation closest to angles $\phi$ and $\psi$, projection of the frame overlay Frame$^i$, limited to the space outside the lens of the reference orientation closest to angles $\phi$ and $\psi$, to obtain a texture overlay of the external surface of the frame Texture Frame$^i_{surface\_exterior}$ that makes it possible to structure the surfaces of the frame outside the lens, in the textured reference model, oriented according to the reference orientation closest to angles $\phi$ and $\psi$, projection of the lens overlay limited to the lens to obtain a lens texture overlay TextureLens$^i$ that makes it possible to structure the lens, in the textured reference model, oriented according to the reference orientation closest to angles $\phi$ and $\psi$.

According to a particular implementation of the method as described, step 560 consists of generating an oriented textured model, oriented according to angles $\phi$ and $\psi$ and according to the scale and orientation of the original photo, from a textured reference model, oriented according to the reference orientation closest to angles $\phi$ and $\psi$, and parameters of similarity $\beta$; this step comprises the following sub-steps:

using a bilinear affine interpolation to orient an interpolated textured model according to the angles ϕ and ψ based on the textured reference model oriented according to the reference orientation closest to these angles ϕ and ψ, using the similarity β to be applied, so as to obtain the same scale, the same image orientation and the same centering as the original photo, thus producing an oriented textured model.

In this case, more specifically, step 560 also comprises a sub-step of geometrically varying the arms of the virtual spectacles according to the morphology of the face of the original photo, so as to obtain a spectacles overlay Spectacles$_{overlay}$ of the virtual pair of spectacles and a binary overlay Spectacles$_{overlay\_binary}$, oriented as the original photo, and which can therefore be superimposed on it.

According to a particular implementation of the method as described, step 570 consists of taking into account the light interactions due to wearing virtual spectacles, particularly the shadows cast onto the face, the visibility of the skin through the lens of the spectacles, the reflection of the environment on the spectacles.

According to a more particular implementation, step 570 comprises the following sub-steps:

1/ creating a shadow map Visibility$^i$ for each reference orientation, obtained by calculating the light occlusion produced by the real pair of spectacles on each area of the average face when the entire face is lit by a light source, said light source being modeled by a set of point sources emitting in all directions, located at regular intervals in a rectangle, 2/ multiplying the shadow map and the photo to obtain a shadowed photo overlay, designated L$_{skin\_Shadowed}$, 3/ blending the shadowed photo overlay L$_{skin\_Shadowed}$ and the spectacles overlay Spectacles$_{overlay}$ by linear interpolation, depending on the coefficient of opacity a of the lens in an area limited to the binary overlay of the virtual pair of spectacles Spectacles$_{overlay\_binary}$, to obtain a final image; this is an image of the original photo on which an image of the selected model of spectacles is superimposed, oriented as the original picture and given shadow properties According to a particular implementation, the method as described further comprises a phase 200 of creating a database of models of eyes DB$_{models\_eyes}$, comprising a plurality of photographs of faces referred to as learning photographs APP$_{eyes}^k$ In this case, more specifically, phase 200 advantageously comprises the following steps:

step 210, of defining a reference face shape and orientation by setting a reference interpupillary distance di$_0$, by centering the interpupillary segment on the center of the image and orienting this interpupillary segment parallel to the image's horizontal axis, then, for each k$^{th}$ learning photograph App$_{eyes}^k$ not yet processed:

step 230, of determining the precise position of characteristic points: exterior point B$_l^k$, B$_r^k$, and interior point A$_l^k$, A$_r^k$ of each eye and determining the respective geometric center G$_l^k$, G$_r^k$ of these eyes and the interpupillary distance di$^k$, step 231, of transforming this k$^{th}$ learning photograph App$_{eyes}^k$ into a gray-scale image APP$_{eyes-gray}^k$, and normalizing the gray-scale image by applying a similarity S$^k$(tx, ty, s, Θ) so as to establish the orientation and scale of the reference face (7) to obtain a k$^{th}$ gray-scale normalized learning photograph APP$_{eyes\_gray\_norm}^k$, step 232, of defining a window of fixed dimensions for each of the two eyes, in the k$^{th}$ gray-scale normalized learning photograph APP$_{eyes\_gray\_norm}^k$. left patch P$_l^k$ and right patch P$_r^k$, the position of a patch P is defined by the fixed distance Δ between the exterior point of the eye B and the edge of the patch P closest to this exterior point of the eye B step 233, for each of the two patches P$_l^k$, P$_r^k$ associated to the k$^{th}$ gray-scale normalized learning photograph APP$_{eyes\_gray\_norm}^k$, of normalizing the gray-scales, step 234, for the first learning photograph App$_{eyes}^1$, of storing each of the patches P$_l^1$, P$_r^1$, called descriptor patches, in the eyes database DB$_{models\_eyes}$, step 235, for each of the patches P associated to the k$^{th}$ gray-scale normalized learning photograph APP$_{eyes\_gray\_norm}^k$, of correlating the corresponding normalized texture column-vector T0 with each of the normalized texture column-vectors T0$_i$ of the corresponding descriptor patches, step 236, of comparing, for each of the patches P$_l^k$, P$_r^k$, this correlation measurement with a previously defined correlation threshold threshold, and, if the correlation is less than the threshold, of storing patch P as a descriptor patch in the eyes database DB$_{models\_eyes}$.

According to a particular implementation, in this case, in step 232, the fixed distance Δ is chosen so that no texture exterior to the face is included in patch P, and the width w and height h of patches P$_l^k$, P$_r^k$ are constant and predefined, so that patch P contains the eye corresponding to this patch P in full, and contains no texture that is exterior to the face, irrespective of the learning photograph App$_{eyes}^k$.

The invention also envisages in another aspect a computer program product comprising program code instructions for executing steps of a method as described when said program is run on a computer.

BRIEF DESCRIPTION OF THE FIGURES

The description that follows, given solely as an example of an embodiment of the invention, is made with reference to the figures included in an appendix, in which.

DETAILED DESCRIPTION OF A MODE OF IMPLEMENTATION OF THE INVENTION

Figure 1A:
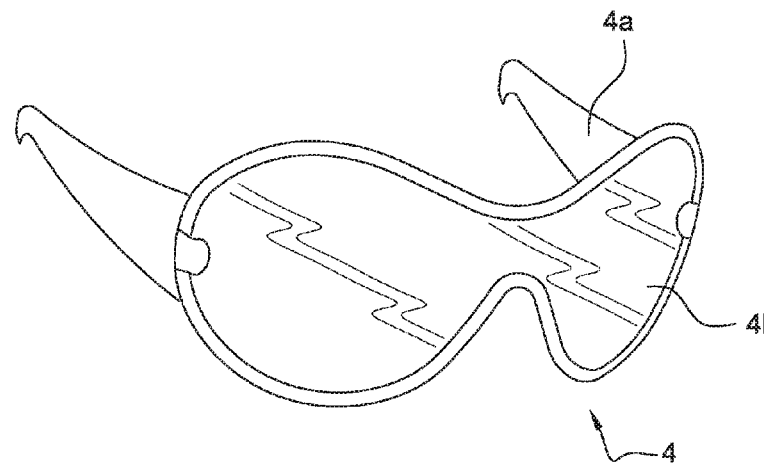
FIG. 1a represents a pair of wraparound sports spectacles.

The method here comprises five phases:
the first phase 100 is a method of modeling real pairs of spectacles allowing a spectacles database $DB_{models\_spectacles}$ of virtual models of pairs of spectacles to be populated,
the second phase 200 is a method of creating a database of models of eyes $DB_{models\_eyes}$,
the third phase 300 is a method of searching for criteria for recognizing a face in a photo.
the fourth phase 400 is a method of searching for criteria for recognizing characteristic points in a face.
the fifth phase 500, referred to as trying on virtual spectacles, is a method of generating a final image 5, from a virtual model 3 of a pair of spectacles, and an original photo 1 of a subject taken, in this example, by a camera and representing the face 2 of the subject.

The first four phases, 100, 200, 300 and 400, are performed on a preliminary basis, while phase 500 of trying on virtual spectacles is utilized many times, on different subjects and different virtual pairs of spectacles, based on the results from the four preliminary phases.

Phase 100 of Modeling Pairs of Spectacles

To begin with the first phase 100, the modeling of pairs of spectacles, is described:

The purpose of this phase of modeling pairs of spectacles is to model a real pair of spectacles 4 geometrically and texturally. The data calculated by this spectacles modeling algorithm, for each pair of spectacles made available during the trying-on phase 500, are stored in a database $DB_{models\_spectacles}$ so as to be available during this trying-on phase.

This spectacles modeling phase 100 is divided into four steps.

Step 110: Obtaining Images of the Real Pair of Spectacles 4

The procedure for constructing a simplified geometric model 6 of a real pair of spectacles 4, uses a device for taking photographs 50.

Figure 2:
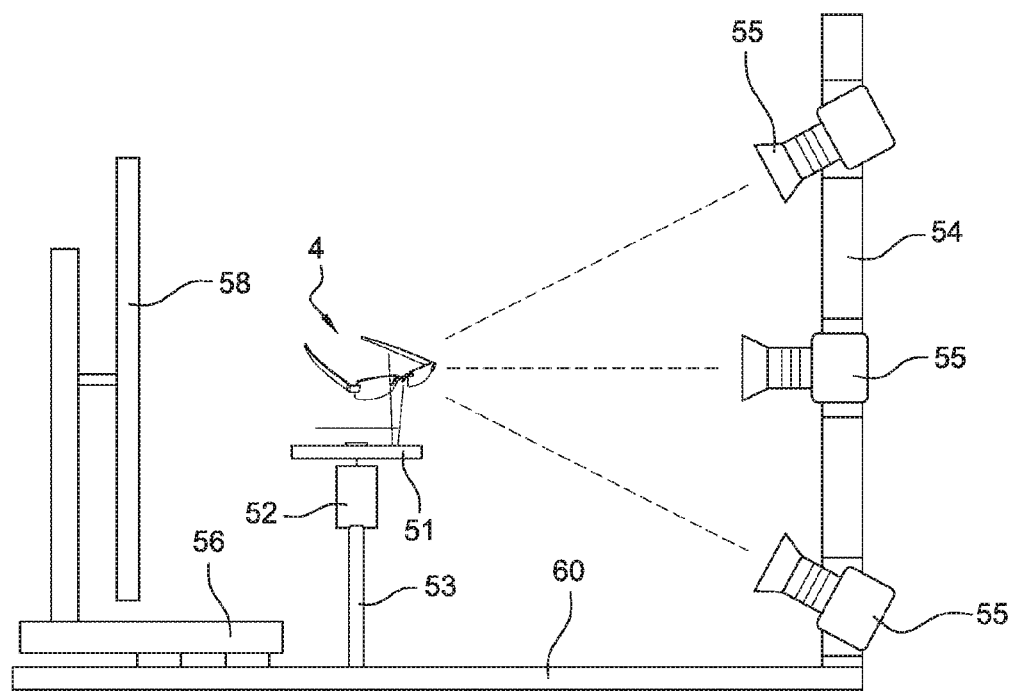
FIG. 2 illustrates the principle for photographing a real pair of spectacles for modeling.

This device for taking photographs 50 is, in this example, represented in FIG. 2 and consists of:
- a base 51, which allows the real pair of spectacles 4 to be modeled to be supported. This base 51 is made of a transparent material such as transparent plexiglas. This base 51 is formed of two parts, 51a and 51b, which fit together. Part 51b is the portion of the base 51 that is in contact with the real pair of spectacles 4 when this is placed on the base 51. Part 51b can be separated from part 51a and can therefore be chosen from a set of parts with shapes optimized with respect to the shape of the object to be placed (goggles, masks, jewelry). Part 51b has three contact points with the real pair of spectacles 4, corresponding to the actual contact points on a face when the real pair of spectacles 4 worn, i.e. at the two ears and the nose.
- a turntable 52 on which part 51a of base 51 is fixed, said turntable 52 being placed on a foot 53; said turntable 52 makes it possible to rotate the removable base according to a vertical axis of rotation Z.
- a vertical rail 54 allowing digital cameras 55 to be attached at different heights (the number of digital cameras 55 is variable, from one to eight in this example). The digital cameras 55 are respectively fixed on the vertical rail 54 by a ball joint allowing rotation in pitch and yaw. This said vertical rail 54 is positioned at a distance from the foot 53, which is fixed in this example. The cameras are oriented such that their respective photographic field contains the real pair of spectacles 4 to be modeled, when it is placed on part 51b of base 51, part 51b being fitted onto part 51a.
- a horizontal rail 56 secured to a vertical mount on which a screen 58 with a changeable background color 59 is attached. In this example, screen 58 is an LCD screen. The background color 59 is selected in this example from the colors red, blue, green, white or neutral, i.e. a gray containing the three colors red, green, blue in a uniform distribution with a value of two hundred, for example. Said horizontal rail 56 is positioned such that the real pair of spectacles 4 to be modeled, placed on part 51b fitted onto fixed part 51a on the turntable 52, is between the screen 58 and the vertical rail 54.
- possibly a base plate 60 supporting the vertical rail 54, the foot 53 and the horizontal rail 56.

The device for taking photographs 50 is controlled by a unit associated to a software system 61. This control consists of managing the position and orientation of digital cameras 55, relative to the object to be photographed, assumed to be fixed, for managing the background color 59 of the screen 58 and its position, and managing the rotation of the turntable 52.

The device for taking photographs 50 is calibrated by conventional calibration procedures in order to accurately know the geometric position of each of the cameras 55 and the position of the vertical axis of rotation Z.

In this example, calibrating the device for taking photographs 50 consists of:
firstly, placing one of the digital cameras 55 sufficiently precisely at the level of the real pair of spectacles 4 to be modeled, so that its respective shot is a frontal view,
secondly, to remove the real pair of spectacles 4 and possibly removable part 51b, and place a test chart 57, not necessarily flat, vertically on the turntable 52. In this non-limiting example, this test chart 57 consists of a checkerboard.
thirdly, to determine the precise position of each digital camera 55 by a conventional method, using images 62 obtained for each of the digital cameras 55 with different shots of the test chart 57, using different screen backgrounds 59.
fourthly, to determine the position of the vertical axis of rotation Z of the turntable 52 using the images 62.

The first step 110 of the spectacles modeling phase consists of obtaining images of the real pair of spectacles 4 from a number of orientations (preferably keeping a constant distance between the camera and the object to be photographed), and under a number of lighting conditions. In this step 110, the lens 4b must match the lens intended for the trying-on phase 500.

The real pair of spectacles 4 is photographed with a camera, at high resolution (typically a higher resolution than 1000×1000) in nine (more generally V) different orientations and in N light configurations showing the transmission and reflection of the spectacle lens 4b.

These nine (V) orientations are called reference orientations and in the rest of the description are designated by $Orientation^i$. These V reference orientations $Orientation^i$ are selected by discretizing a spectrum of orientations corresponding to possible orientations when spectacles are tried on. V*N high-resolution images of the real pair of spectacles 4 are thus obtained, designated Image-spectacles$^{i,j}$ ($1 \leq i \leq V$, $1 \leq j \leq N$).

In the present example, the number V of reference orientations Orientation$^i$ is equal to nine, i.e. a relatively small number of orientations from which to derive a 3D geometry of the model. However, it is clear that other numbers of orientations may be envisaged with no substantial change to the method according to the invention.

If an orthogonal reference space with axes x, y, z is defined, where the y-axis corresponds to the vertical axis, $\psi$ to the angle of rotation around the x-axis, $\phi$ to the angle of rotation around the y-axis, the nine positions Orientation$^i$ selected here (defined by the pair $\phi$, $\psi$) are such that the angle $\psi$ takes the respective values −16°, 0° or 16°, the angle $\phi$ takes the respective values −16°, 0° or 16°.

Figure 4:
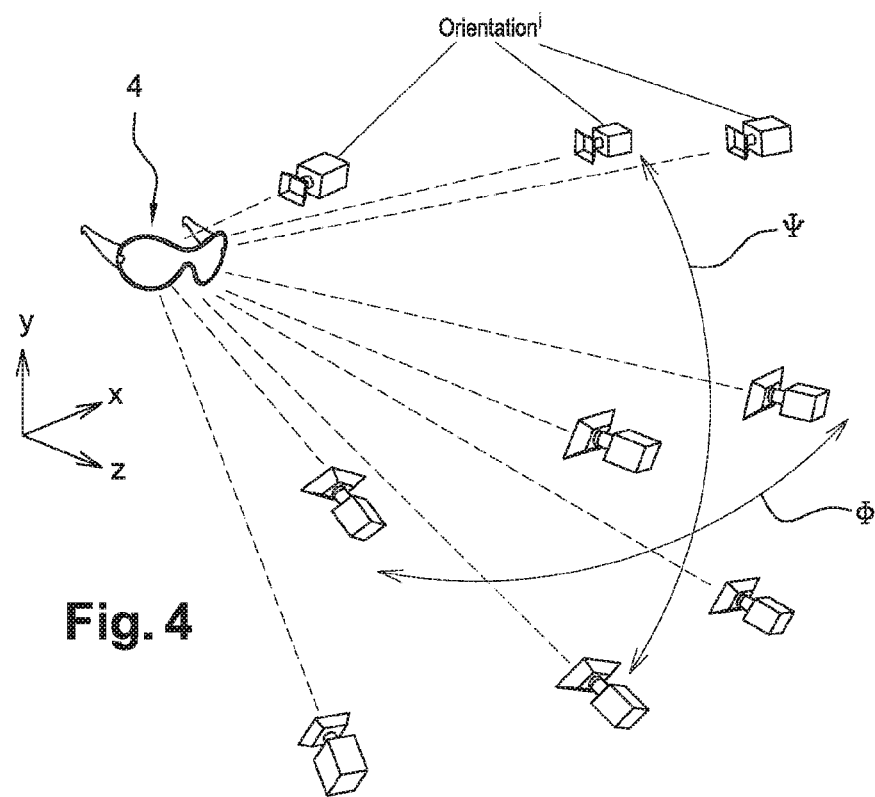
FIG. 4 represents the nine shots of a pair of spectacles.

FIG. 4 represents a real pair of spectacles 4 and the nine orientations Orientation$^i$ of the shots.

In the present implementation example of the method, two light configurations are chosen, i.e. N=2. By choosing nine camera positions (corresponding to the reference orientations Orientation$^i$), i.e. V=9, and two light configurations, N=2, eighteen high-resolution images Image-spectacles$^{i,j}$ representing a real pair of spectacles 4 are obtained; these eighteen high-resolution images Image-spectacles$^{i,j}$ correspond to the nine orientations Orientation$^i$ in the two light configurations.

The first light configuration respects the colors and materials of the real pair of spectacles 4. Neutral conditions of luminosity are used for this first light configuration. The nine (and more generally V) images Image-spectacles$^{i,1}$ created in this light configuration allow the maximum transmission of light through the lenses 4b to be revealed (there is no reflection on the lens and the spectacle arms can be seen through the lenses). They are called high-resolution transmission images and in the rest of the description are designated by Transmission$^i$; the exponent i is used to characterize the i$^{th}$ view, where i varies from 1 to V.

The second light configuration highlights the special geometric features of the real pair of spectacles 4, such as, for example, the chamfers. This second light configuration is taken in conditions of intense reflection.

The high-resolution images Image-spectacles$^{i,2}$ obtained in this second light configuration reveal the physical reflection properties of the lens 4b (the arms are not seen behind the lenses, but reflections of the environment on the lens are; transmission is minimal). The nine (or V) high-resolution images of the real pair of spectacles 4, created in this second light configuration are called high-resolution reflection images and in the rest of the description are designated by Reflection$^i$; the exponent i is used to characterize the i$^{th}$ view, where i varies from 1 to V.

Figure 5:
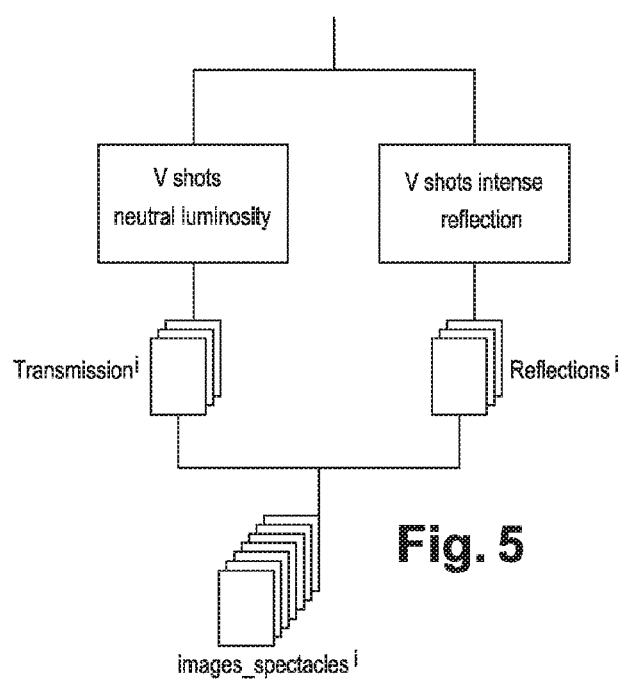
FIG. 5 is a schematic of the step for obtaining images of the real pair of spectacles.

According to the method just described, the set of high-resolution images Image-spectacles$^{i,j}$ of real pairs of spectacles comprises, by definition, both the high-resolution transmission images Transmission$^i$ and the high-resolution reflection images Reflection$^i$. Obtaining the set of high-resolution images Image-spectacles$^{i,j}$ by this step 110 is illustrated in FIG. 5.

Step 120: Generating Overlays of Spectacles

Figure 6:
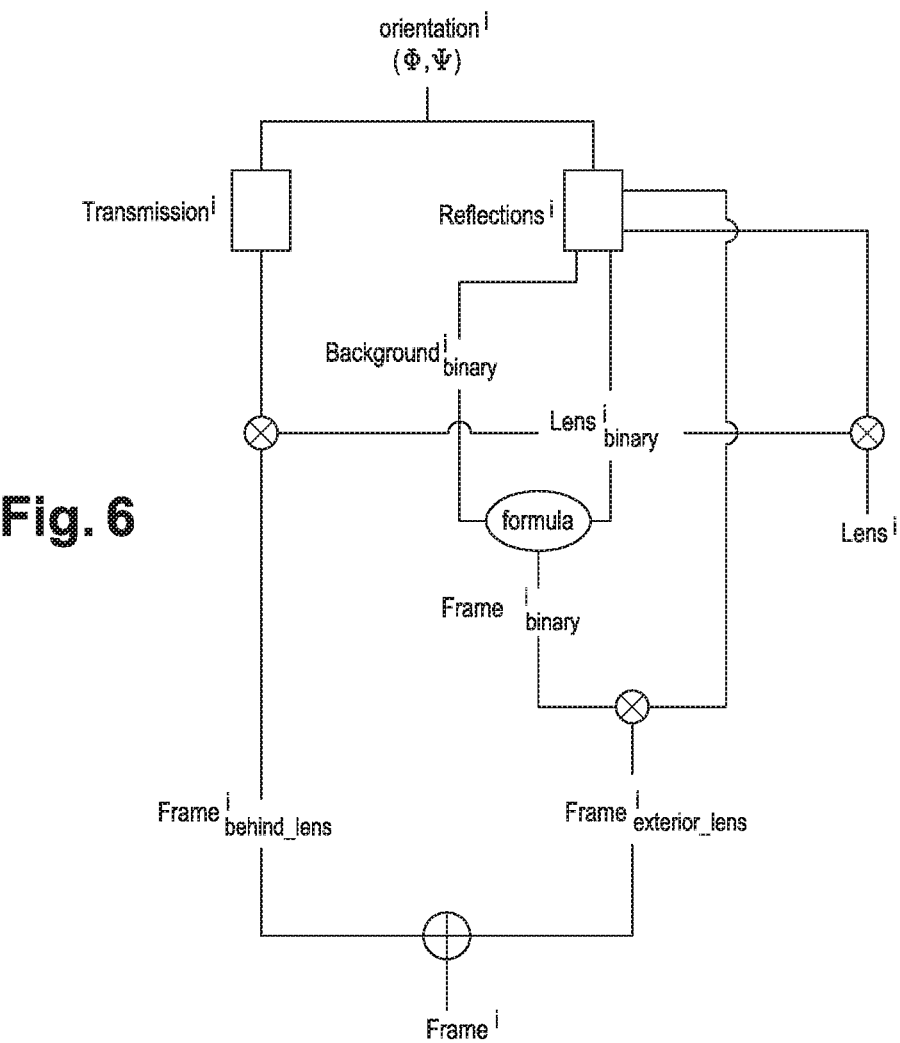
FIG. 6 is a schematic of the step for generating overlays of spectacles.

The second step 120 of spectacles modeling phase 100 consists of generating overlays for each of the nine reference orientations Orientation$^i$. A schematic of this second step 120 is shown in FIG. 6. It is understood that an overlay is defined here in the sense known to the expert in the field of image processing. An overlay is a raster image with the same dimensions as the image from which it is derived.

For each of the nine (and more generally V) reference orientations Orientation$^i$, the high-resolution reflection image Reflection$^i$ is taken. A binary image is then generated with the same resolution as the high-resolution reflection image of the reference orientations. This binary image actually shows the "outline" shape of the lenses 4b of the real pair of spectacles 4. This binary image is called a lens silhouette and is designated Lens$^i_{binary}$.

Extraction of the shape of the lenses needed generate the lens silhouette is performed by an active contours algorithm (e.g. of a type known to those skilled in the art under the name "2D snake") based on the assumption that the frame 4a and the lenses 4b have different transparencies. The principle of this algorithm, known per se, is to deform a curve having several deformation constraints. At the end of the deformation, the optimized curve follows the shape of the lens 4b.

The curve to be deformed is defined as a set of 2D points placed on a line. The k$^{th}$ point of the curve associated with the coordinate xk in the high-resolution reflection image Reflection$^i$ associated to a current reference orientation, has an energy E(k). This energy E(k) is the sum of an internal energy E$_{internal}$(k) and an external energy E$_{external}$(k). The external energy E$_{external}$(k) depends on the high-resolution reflection image Reflection$^i$ associated to a current reference orientation, whereas the internal energy E$_{internal}$(k) depends on the shape of the curve. This therefore gives E$_{external}$(k)−∇(xk), where ∇ is the gradient of the high-resolution reflection image Reflection$^i$ associated to a current reference orientation. The internal energy E$_{internal}$(k) is the sum of an energy referred to as the "balloon" energy E$_{balloon}$(k), and a curvature energy E$_{curvature}$(k) This therefore gives E$_{internal}$(k)=E$_{balloon}$(k)+E$_{curvature}$(k)

The balloon energies E$_{balloon}$(k) and the curvature energies E$_{curvature}$(k) are calculated using standard formulas in the field of active contour methods, such as the method known as the Snake method.

In this lens silhouette Lens$^i_{binary}$, the value of the pixel is equal to one if the pixel represents the lenses 4b, and zero if not (which, in other words, in effect forms an outline image).

It is understood that it is also possible to use gray scales (values between 0 and 1) instead of binary levels (values equal to 0 or 1) to produce such a lens overlay (for example by creating a gradual transition between the values 0 and 1 either side of the optimized curve obtained by the active contours method described above).

A lens overlay, designated Lens$^i_{overlay}$, is then generated for each of the nine (V) reference orientations by copying, for each pixel with a value equal to one in the lens silhouette Lens$^i_{binary}$, the information contained in the high-resolution reflection image Reflection$^i$ and assigning zero to the other pixels. The exponent i of variables Lens$^i_{binary}$ and Lens$^i_{overlay}$ varies from 1 to V, where V is the number of reference orientations.

This lens overlay Lens$^i_{overlay}$ is, to some extent, a high-definition cropped image of the lens using, for cropping the original high-definition image, the lens silhouette Lens$^i_{binary}$ (outline shape) created previously.

Designating the term to term matrix product operator by $\otimes$, this gives:

$$\text{Lens}^i_{overlay} = \text{Lens}^i_{binary} \otimes \text{Reflection}^i \quad (\text{Eq 1})$$

Thus, for a pixel with position x, y $$\text{Lens}^i_{overlay}(x,y) = \text{Lens}^i_{binary}(x,y) \times \text{Reflection}^i(x,y)$$

For each of the reference orientations, the associated high-resolution reflection image Reflection$^i$ is chosen, and then, for each of them, a binary background image Background$^i_{binary}$ is then generated by automatically extracting the background, using a standard image background extraction algorithm. A binary image, called binary frame overlay Frame$^i_{binary}$, is then generated for each of the V reference orientations, by deducting from a neutral image the outline image of the lenses and the outline image of the background, i.e. in more mathematical terms, by applying the formula:

$$\text{Frame}^i_{binary}=1-(\text{Lens}^i_{binary}+\text{Background}^i_{binary}) \quad \text{(Eq 2)}$$

An overlay, referred to as the texture overlay of the frame behind the lens Frame$^i_{behind\_lens}$, is then generated of the texture of the frame corresponding to the portion of the frame located behind the lenses 4b (for example, a portion of the arms may be visible behind the lens 4b depending on the orientation) for each of the nine (V) reference orientations, by copying, for each pixel with a value equal to one in the binary lens overlay Lens$^i_{binary}$, the information contained in the high-resolution transmission image Transmission$^i$, and assigning zero to the other pixels.

$$\text{This gives: Frame}^i_{behind\_lens}=\text{Lens}^i_{binary} \otimes \text{Transmission}^i \quad \text{(Eq 3)}$$

Thus, for a pixel with position x, y:

$$\text{Frame}^i_{behind\_lens}(x,y)=\text{Lens}^i_{binary}(x,y) \times \text{Transmission}^i(x,y)$$

Similarly an overlay, referred to as the texture overlay of the frame outside the lens Frame$^i_{exterior\_lens}$ is generated for each of the nine (V) reference orientations by copying, for each pixel with a value equal to one in the binary frame overlay Frame$^i_{binary}$, the information contained in the high-resolution reflection image Reflection$^i$ and assigning zero to the other pixels.

The exponent i of variables Frame$^i_{binary}$, Background$^i_{binary}$, Frame$^i_{exterior\_lens}$ and Frame$^i_{behind\_lens}$ varies from 1 to V, where V is the number of reference orientations Orientation$^i$.

$$\text{This gives: Frame}^i_{exterior\_lens}=\text{Frame}^i_{binary} \otimes \text{Reflection}^i \quad \text{(Eq 4)}$$

A texture overlay of the frame Frame$^i$ is defined as the sum of the texture overlay of the frame behind the lens Frame$^i_{behind\_lens}$ and the texture overlay of the frame outside the lens Frame$^i_{exterior\_lens}$.

$$\text{This gives: Frame}^i=\text{Frame}^i_{behind\_lens}+\text{Frame}^i_{exterior\_lens} \quad \text{(Eq 5)}$$

Step 130: Geometric Model

The third step 130, of the spectacles modeling phase 100 consists of obtaining a simplified geometric model 6 of a real pair of spectacles 4. A real pair of spectacles 4 comprises a frame 4a and lenses 4b (the notion of lenses 4b comprises the two lenses mounted in the frame 4a). The real pair of spectacles 4 is represented in FIG. 1a.

This step 130 does not involve the reflection characteristics of the lenses 4b mounted in the frame 4a; the real pair of spectacles 4 may be replaced by a pair of spectacles comprising the same frame 4a with any lenses 4b having the same thickness and curvature.

This simplified geometric model 6, can be obtained:
either by extracting its definition (radius of curvature of the frame, dimensions of the frame) from a database DB$_{models\_spectacles}$ of geometric models associated to pairs of spectacles.
or, according to the preferred approach, by constructing the simplified geometric model 6 using a construction procedure. The new geometric model 6, thus created, is then stored in a database of models DB$_{models\_spectacles}$.

There are several possible ways to construct a geometric model suitable for the rendering method described in step 120. One possible method is to generate a dense 3d mesh that faithfully describes the shape of the pair and is extracted either by automatic reconstruction methods [C. Hernández, F. Schmitt and R. Cipolla, Silhouette Coherence for Camera Calibration under Circular Motion, IEEE Transactions on Pattern Analysis and Machine Intelligence, vol. 29, no. 2, pp. 343-349, February, 2007] or by exploiting existing 3D models from manual modeling by CAD (Computer Aided Design) systems. A second method consists of modeling the real pair of spectacles 4 by a 3D active contour linked to a surface mesh. An optimization algorithm deforms the model so that the projections of its silhouette in each of the views best match the silhouettes detected in the images (using a procedure as described).

The real pair of spectacles 4 is modeled by a surface mesh that is dense or has a low number of facets (traditionally known by the name "low polygon number" or "LowPoly"). This last method is. The initial shape is used to introduce one a priori with a weak shape; it can be generic or chosen from a database of models according to the pair to be reconstructed. In what follows, the case of a simplified geometric model (i.e. a "low polygons" type) will be described.

Figure 1B:
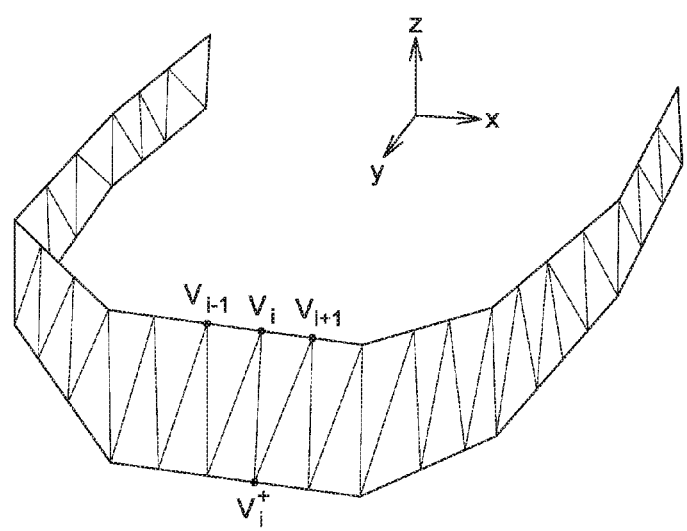
FIG. 1b represents an initial mesh used to represent a real pair of spectacles.

The mesh comprises N summits, designated V$_i$. The mesh has the shape of a triangle strip, as shown in FIG. 1b. Furthermore it is assumed that the number of summits on the upper contour of the mesh is equal to the number of summits on the lower contour of the mesh, and that the sampling of these two contours is similar. Thus, an "opposite" summit, V$_i^+$ can be defined for each summit V$_i$.

Figure 1C:
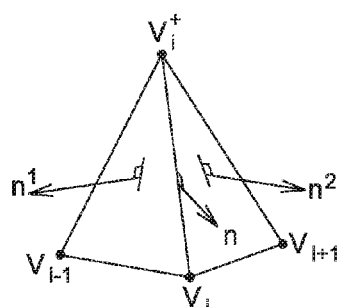
FIG. 1c illustrates the definition of the normal to the surface in a segment V$_i^+$ V$_j$.

Regardless of the actual topology of the mesh, the neighborhood $\mathcal{N}_i$ of the summit V$_i$ is described by $\mathcal{N}_i=\{V_{i+1}; V_{i-1}; V_i^+\}$ The summits V$_{i+1}$ and V$_{i-1}$ are the neighbors of V$_i$ along the contour of the mesh. The summit V$_i^+$ corresponds to the summit opposite to V$_i$, as defined earlier. This neighborhood also allows two triangles T$_i^1$ and T$_i^2$ to be constructed (see FIG. 1c). Let n$^1$ and n$^2$ be their respective normals. The normal to the surface in segment V$_i^+$ V$_i$ (which is a topological peak or not) is defined by $$n = \frac{n^1 + n^2}{\|n^1 + n^2\|} \quad \text{(Eq 6)}$$

To develop the active contour to the image data, an energy is associated to the current 3D model: the closer the projected silhouettes of the model are to the contours in the images, the lower this energy is. Each summit is then displaced iteratively so as to minimize this energy until convergence (i.e. until the energy is no longer reduced by a displacement). In addition, one seeks to obtain a smooth model, which leads us to define at each summit an internal energy not dependent on images. The energy associated to the summit V$_i$ is given by:

$$E_i=\lambda_d E_{d,i}+\lambda_r E_{r,i}+\lambda_c E_{c,i}+\lambda_o E_{o,i} \quad \text{(Eq 7)}$$

The term E$_{d,i}$ is the linking term to the image data, i.e. to the contours calculated in the different views. The three other terms are smoothing terms, which do not depend on images.

The term E$_{r,i}$ is a repulsion term that tends to distribute the summits uniformly.

The term E$_{c,i}$ is a curvature term that tends to make the surface smooth.

Finally the term E$_{o,i}$ is an obliquity term aimed at minimizing the gap in the (x; y) plane between Vi and V$_i^+$ The weights $\lambda_d, \lambda_r, \lambda_c, \lambda_o$ are common to all the summits and in general $\lambda_d \gg \lambda_r, \lambda_c, \lambda_o$.

The linking term to data $E_{d,i}$ characterizes the proximity of the silhouette of the current active contour with the contours detected in the images (by an active contour procedure as described in step 120 above). In the acquisition process, an automatic cropping phase, of a type known per se ("difference matting"), provides an opacity map for each view.

The contours are obtained by thresholding the gradient of this opacity map. The contour information is propagated to the entire image by calculating, for each view k, a map of distances to the contours, designated $D_k$. The projection model of the 3D model in the images is a model of pinhole camera, of a type known per se, defined by the following elements:

a matrix $K_k$ (3×3 matrix) containing the camera's internal parameters, a matrix $E_k=[R_k|t_k]$ (3×4 matrix) describing the switch from the world reference space (as presented in FIG. 1*b*) to the camera reference space of view k.

$$\Psi_k(x; y; z) = \left(\frac{u}{w}, \frac{v}{w}\right)^T$$

designates the projection of 3D point $(x, y, z)^T$ in view k. It is obtained by $$\begin{pmatrix} u \\ v \\ w \end{pmatrix} = K_k E_k \begin{pmatrix} x \\ y \\ z \\ 1 \end{pmatrix} \quad \text{(Eq 8)}$$

The linking energy to the data is thus expressed by:

$$E_{d,i} = \frac{1}{|S|} \sum_{k \in S} (D_k(\Psi_k(V_i)))^2 \quad \text{(Eq 9)}$$

where S and the set of views in which the summit $V_i$ is visible and $|S|$ its cardinal.

The repulsion term $E_{r,i}$ tends to minimize the difference in length of two peaks of the contour joining at $V_i$. It is expressed by:

$$E_{r,i} = \left(\frac{\|V_{i-1} - V_i\| - \|V_{i+1} - V_i\|}{\|V_{i-1} - V_i\| + \|V_{i+1} - V_i\|}\right)^2 \quad \text{(Eq 10)}$$

The curvature term $E_{c,i}$ tends to reduce the curvature perpendicular to segment $V_i^+ V_i$ The corresponding energy is expressed by $E_{c,i}=(1-n^{1T}n^2)^2$ (Eq 11)

where $n^1$ and $n^2$ are the normals defined above.

The obliquity term $E_{o,i}$ tends to preserve the vertical correspondence between the points of the upper contour and the points of the lower contour. For this, it is assumed that the orientation of the model of the spectacles is as in FIG. 1, namely that the z axis is the axis perpendicular to the natural plane of the pair "placed on the table".

This thus gives $E_{o,i}=(d_i^T a)^2$ (Eq 12)

where $d_i$ designates segment $V_i^+ V_i$

The resolution is done by scanning each summit $V_i$ of the mesh iteratively and one seeks to minimize the associated energy function $E_i$. This is a nonlinear function, therefore a Newton type of iterative minimization method is used. The development, limited to the second order of the energy function, for a small displacement $\delta_i$ of the summit, is expressed by:

$$E_i(V_i+\delta_i) \approx E_i(V_i) + \nabla_{Ei}^T \delta_i + \delta_i^T H_{Ei} \delta_i \quad \text{(Eq 13)}$$

where $\nabla_{Ei}$ is the gradient of $E_i$, and $H_{Ei}$ is its Hessian matrix (both evaluated in $V_i$).

The initial non-linear minimization problem is replaced by a succession of linear problems.

Let $f(\delta_i) = E_i(V_i) + \nabla_{Ei}^T \delta_i + \delta_i^T H_{Ei} \delta_i$ and one seeks the minimum $\hat{\delta}_i$ of f relative to $\delta_i$.

It satisfies the condition: $f'(\hat{\delta}_i)=0$, i.e. $\nabla_{Ei}^T + H_{Ei}\hat{\delta}_i = 0$ At each iteration, the summit $V_i^{k-1}$ is displaced in the direction $\hat{\delta}_i^k$ $$V_i^k = V_i^{k-1} + \lambda^k \hat{\delta}_i^k \quad \text{(Eq 14)}$$

The length of step $\lambda^k$ is either optimized (a standard method referred to as "line-search"), or determined beforehand and left constant throughout the procedure.

The iterative procedure described above is stopped when the step is normally below a threshold, when more than $k_{max}$ iterations have been performed, or when the energy $E_i$ does not reduce sufficiently from one iteration to the next.

In a variant to this construction procedure, 3D modeling software is used to model the geometry of the real pair of spectacles 4.

In another variant of this construction procedure, a model of the database of models $DB_{models\_spectacles}$ is used and it is adapted manually.

The simplified geometric model 6 is formed of a number N of polygons and their normals, taking as the orientation of these normals the exterior of the envelop convex to the real pair of spectacles 1. In this non-limiting example the number N is a value close to twenty.

Figure 1D:
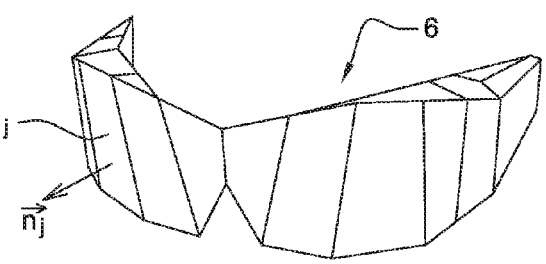
FIG. 1d represents a simplified model for a pair of wraparound sports spectacles.

FIG. 1*d* represents a simplified model for a pair of wraparound sports spectacles. In the remainder of the description, these polygons of the simplified geometric model 6, are called the surfaces of the modeled pair of spectacles designated by surface$_j$. The normal to a surface of the modeled pair of spectacles surface$_j$ is designated by $\vec{n}_j$; j is a numbering index of the surfaces surface$_j$ which varies from 1 to N.

Figure 3:
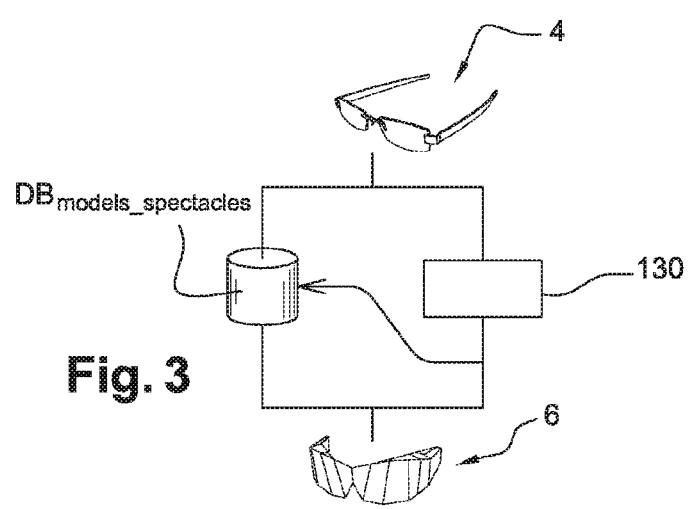
FIG. 3 is a schematic of the step for obtaining a simplified geometric model.

A schematic of step 130 is shown in FIG. 3.

Step 140: Creating a Shadow Map

Figure 7A:
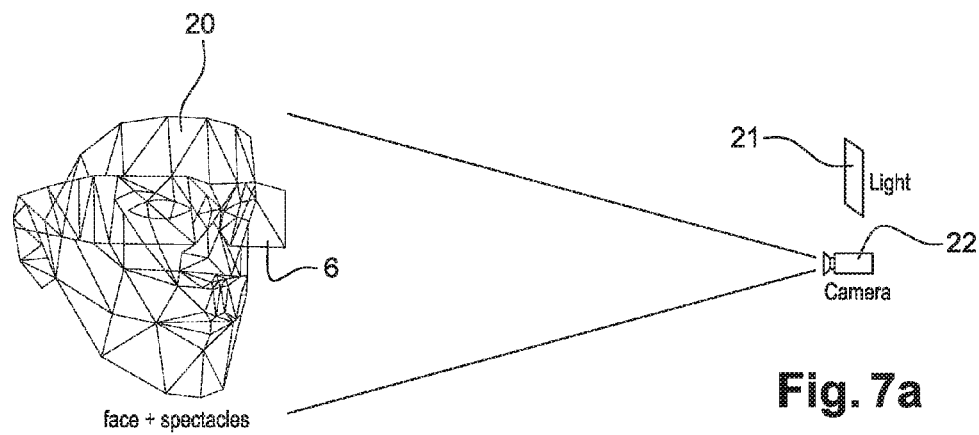
FIGS. 7a and 7b illustrate the creation of a shadow map on an average face.

In this step a shadow map, designated Visibility$^i$, is created for each of the reference orientations Orientation$^i$. The goal is to calculate the shadow produced by the pair of spectacles on a face, modeled here by an average face 20, a 3D model constructed in the form of a mesh of polygons (see FIG. 7*a*).

The modeling of the face in question corresponds to an average face 20, which makes it possible to calculate a shadow suitable for any person. The method calculates the light occlusion produced by the pair of spectacles on each area of the average face 20. The technique envisaged allows very faithful shadows to be calculated while requiring only a simplified geometric model 6 of the real pair of spectacles 4. This procedure is applied to calculate the shadow produced by the pair of spectacles, for each image of said pair of spectacles. The final result obtained are 9 shadow maps Visibility$^i$ corresponding to the 9 reference orientations Orientation$^i$ used, in this example, during the creation of the image-based rendering.

For each reference orientation, this shadow map Visibility$^i$ is calculated using the simplified geometric model 6 of the real pair of spectacles 4 ("low polygons" surface simplified model, see step 130), a textured reference model 9 (superimposition of texture overlays of the pair of spectacles corresponding to a reference orientation) oriented according to the reference orientation Orientation$^i$, a modeling of an average face 20, a modeling of a light source 21 and a modeling 22 of a camera.

The shadow map Visibility$^i$ is obtained by calculating the light occlusion produced by each elementary triangle forming the simplified geometric model 6 of the real pair of spectacles 4, on each area of the average face 20, when everything is lit by the light source 21. The light source 21 is modeled by a set of point sources emitting in all directions, located at regular intervals in a rectangle, for example as a 3×3 matrix of point sources.

The modeling 22 of a camera is standard modeling of a type known as pinhole, i.e. modeling without a lens and with a very small and simple opening. The shadow map Visibility$^i$ obtained is an image comprising values between 0 and 1.

The coordinates (X,Y) of the 2D projection of a vertex (x,y,z) of the 3D scene is expressed as follows:

$$X = u0 + f \times \frac{x}{z},$$
$$Y = v0 + f \times \frac{y}{z}$$
(Eq 15)

in which the parameters $u_0$, $v_0$, f characterize the camera.

Let K designate the operator that, at a vertex V(x,y,z), associates its projection P(X,Y) in the image. A set of 3D points {V} corresponds to a pixel P with coordinates (X,Z) such that K(V)=P.

The set of these 3D points forms a radius. Subsequently, when reference is made to a 3D radius associated with a pixel, the 3D radius corresponds to the set of 3D points projected on the pixel.

Figure 7B:
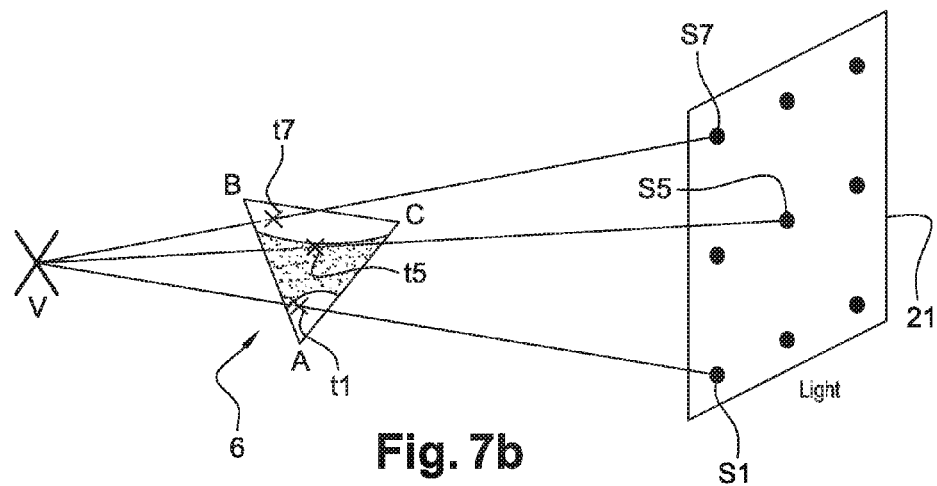

To calculate the shadow, for each pixel P with coordinate (i,j) in the shadow image Visibility$^i$, the value O(i,j) of the shadow image is calculated. For this, the 3D vertex V of the face that corresponds to the projection P is calculated. This term V is defined as the intersection of the 3D radius defined by the pixel and the 3D model of the face 20 (see FIG. 7*b*).

Then, the light occlusion produced by the pair of spectacles on this vertex is calculated. To do this, the light occlusion produced by each triangle of the low-resolution geometric model 6 is calculated.

Let A(m), B(m), C(m) designate the three summits of the mth triangle of the low-resolution geometric model 6. For each light point source Sn, the intersection tn of the light ray passing through V is calculated.

Tn is the 2D projection of vertex tn on the texture image (textured reference model 9 of the pair of spectacles). The transparency of the texture is known from step (120) of cropping on differences, therefore, the pixel Tn has a transparency, designated by α(Tn).

Finally, the value of pixel O(i,j) of the shadow image is expressed as follows:

$$O(i,j) = \text{Coefficient} \times \sum_{m=1}^{NTriangles} \sum_{n=1}^{NSources} \alpha(T(m,n))$$
(Eq 16)

The Coefficient term allows the opacity of the shadow Visibility$^i$ to be adjusted according to the visual rendering wanted.

The data obtained in phase 100 are stored in a spectacles database $DB_{models\_spectacles}$ that contains, for each pair of spectacles modeled, the simplified geometric model 6 of this real pair of spectacles 4, the lens overlays $Lens^i_{overlay}$, the overlays of the frame behind the lens $Frame^i_{behind\_lens}$ and the overlays of the frame outside the lens $Frame^i_{exterior\_lens}$, for each of the V reference orientations.

In addition, data specific to the lenses 4*b* of the real pair of spectacles 4 are added to the previously mentioned data in the spectacles database $DB_{models\_spectacles}$, such as its coefficient of opacity a, known by the manufacturer, and possibly supplied for each reference orientation.

Phase 200 of Creating a Database of Models of Eyes $DB_{models\_eyes}$

The second phase 200 makes it possible to create a database of models of eyes, $DB_{models\_eyes}$. To simplify its description, it is subdivided into ten steps (210, 220, 230 to 236 and 240). The database of models of eyes, $DB_{models\_eyes}$, thus obtained is used, in the trying-on phase 500, to characterize the eyes of a person photographed.

This eyes database $DB_{models\_eyes}$ can be created, for example, from at least two thousand photographs of faces, referred to as learning photographs $App_{eyes}^k$ (1≤k≤2000). These learning photographs are advantageously, but not obligatorily, the same size as the images of models of spectacles and of the face of the user in the trying-on method.

Step 210. When this eyes database $DB_{models\_eyes}$ is created, first of all a reference face 7 shape is defined by setting a reference interpupillary distance $di_0$, by centering the interpupillary segment on the center of the image and orienting the interpupillary segment parallel to the horizontal axis of the image (face not tilted). The reference face 7 is therefore centered on the image, with the face orientation and magnification depending on the reference interpupillary distance $di_0$.

Step 220. In a second step a correlation threshold threshold is defined.

Then, for each $k^{th}$ learning photograph $App_{eyes}^k$ not yet processed, steps 230 to 236 are applied.

Figure 8:
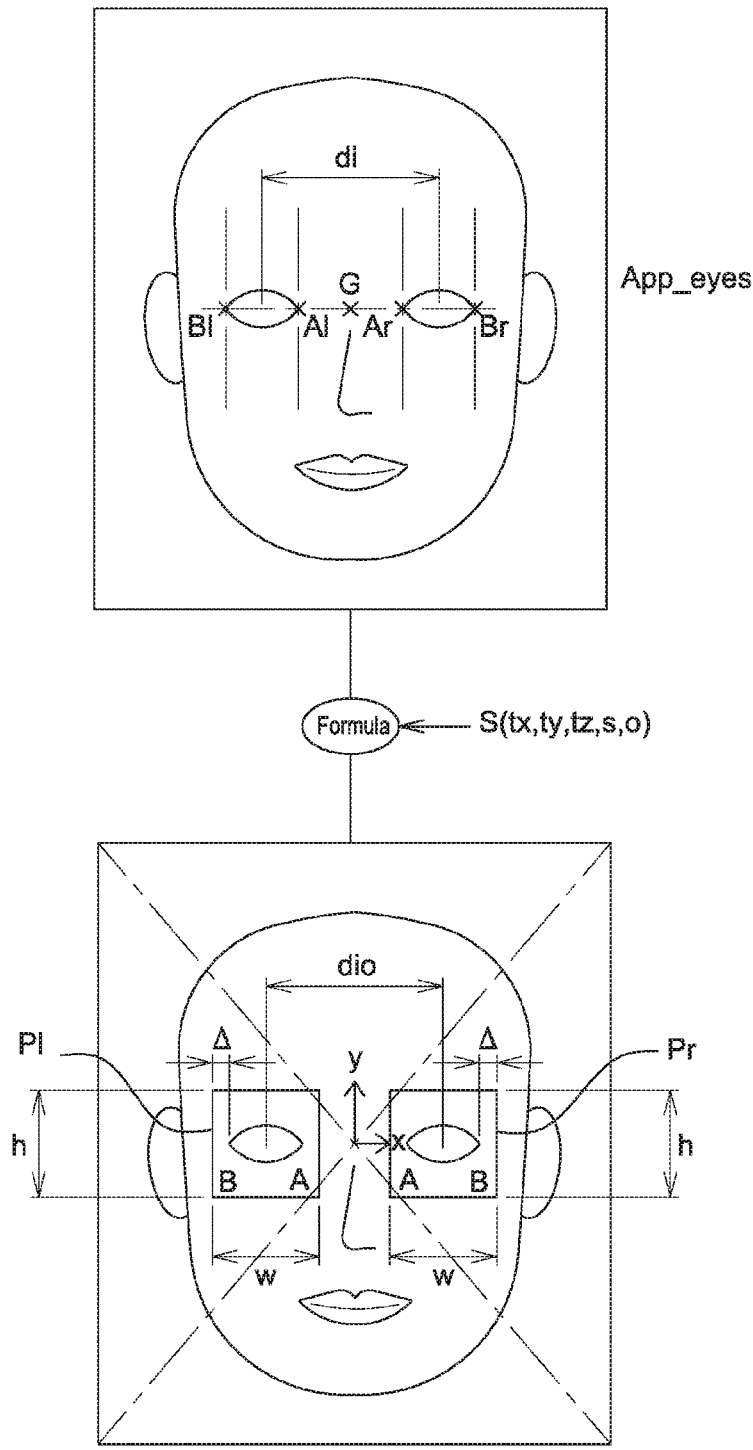
FIG. 8 is a schematic of the transition between a learning photograph and a gray-scale normalized learning photograph.

Step 230—The precise position of characteristic points (corners of the eyes) are determined, manually in this example, i.e. the position of the exterior point $B_l^k$, $B_r^k$ of each eye (left and right respectively with these notations) and the position of the interior point $A_l^k$, $A_r^k$, as defined in FIG. 8. Each position is determined by its two coordinates within the image.

The respective geometric centers $G_l^k$, $G_r^k$ of these eyes are determined, calculated as the barycenter of the exterior point $B^k$ of the corresponding eye and the interior point $A^k$ of this eye, and the interpupillary distance $di^k$ is calculated.

Step 231—This $k^{th}$ learning photograph $App_{eyes}^k$ is transformed into a gray-scale image $APP_{eyes\text{-}gray}^k$, by an algorithm known per se, and the gray-scale image is normalized by applying a similarity $S^k(tx, ty, s, \Theta)$ so as to establish the orientation (front view), scale (reference interpupillary distance $di_0$) of the reference face 7.

This similarity $S^k(tx, ty, s, \Theta)$ is determined as the mathematical operation to be applied to the pixels of the learning photograph $App_{eyes}^k$ to center the face (center of eyes equal to the center of the photograph), orientation of face and magnification depending on the reference interpupillary distance $di_0$. The terms tx and ty designate the translations to be applied on the two axes of the image so as to establish the centering of the reference face 7. Similarly, the term s designates the magnification factor to be applied to this image, and the term Θ designates the rotation to be applied to the image so as to establish the orientation of the reference face 7.

A $k^{th}$ gray-scale normalized learning photograph $APP_{eyes\_gray\_norm}^k$ is thus obtained. The interpupillary distance is equal to the reference interpupillary distance $di_0$. The interpupillary segment is centered on the center of the $k^{th}$ gray-scale normalized learning photograph $APP_{eyes\_gray\_norm}^k$. The interpupillary segment is parallel to the horizontal axis of the gray-scale normalized learning photograph $APP_{eyes\_gray\_norm}^k$.

Step 232—A window, rectangular in this example, with a fixed size (width w and height h) is defined for each of the eyes, in the $k^{th}$ gray-scale normalized learning photograph $APP_{eyes\_gray\_norm}^k$. These two windows are called the left patch $P_l^k$ and right patch $P_r^k$ in the remainder of this description, according to a standard usage in this field. For simplicity, the term patch P will be used to denote either one of these patches $P_l^k$, $P_r^k$. Each patch P is a sub-raster image extracted from an initial raster image of a face. It is clear that, in a variant, a shape other than rectangular may be used for the patch, for example polygonal, elliptical or circular.

The position of the patch P corresponding to an eye (left, right respectively), is defined by the fixed distance Δ between the exterior point of the eye B and the edge of the patch P closest to this exterior point of the eye B (see FIG. 7).

This fixed distance Δ is chosen so that no texture exterior to the face is included in the patch P. The width w and height h of patches $P_l^k$, $P_r^k$ are constant and predefined, so patch P contains the eye corresponding to this patch P in full, and contains no texture that is external to the face, irrespective of the learning photograph $APP_{eyes}^k$.

Step 233—For each of the two patches $P_l^k$, $P_r^k$ associated to the $k^{th}$ gray-scale normalized learning photograph $APP_{eyes\_gray\_norm}^k$ (each corresponding to one eye), the gray-scales are normalized.

To do this, a texture column-vector T, called the original texture column-vector, is defined, comprised of the gray-scales for patch P, in this example stored in row order the size of the texture column-vector T is equal to the number of lines (h) multiplied by the number of columns (l) and a column-vector 1 with a unit value is defined, the same size as the texture column-vector T.

The mathematical operation therefore consists of calculating the mean of the gray-scales of patch P, mean designated $\mu_T$, of normalizing the standard deviation of these gray-scales, designated $\sigma_T$, and of applying the formula:

$$T0 = \frac{(T - \mu_T 1)}{\sigma_T} \qquad \text{(Eq 17)}$$

where T0 is the normalized texture column-vector (gray-scale) and T the original texture column-vector.

Step 234—This step 234 is only performed for the first learning photograph $APP_{eyes}^1$. The eyes database $DB_{models\_eyes}$ is therefore empty.

For the first learning photograph $APP_{eyes}^1$ processed, each of the patches $P_l^1$, $P_r^1$ is added to the eyes database $DB_{models\_eyes}$; with the following data stored:
the normalized texture column-vector $T0_l^1$, $T0_r^1$ corresponding to a patch $P_l^1$, $P_r^1$, the precise position of the normalized characteristic points, by applying the similarity $S^1$ (tx, ty, s, Θ) to the precise positions of characteristic points identified beforehand in the learning photograph $APP_{eyes}^1$,
the similarity $S^1$ (tx, ty, s, Θ),
and other useful information: morphology, brightness etc., then one goes to step 230 for processing the second learning photograph $APP_{eyes}^2$ and the following ones $APP_{eyes}^k$.

Patches $P_l^1$, $P_r^1$ stored in the eyes database $DB_{models\_eyes}$ in this step 234 and in step 236 are called descriptor patches.

Step 235—For each of the patches P associated to the $k^{th}$ gray-scale normalized learning photograph $APP_{eyes\_gray\_norm}^k$ (each corresponding to one eye), the corresponding normalized texture column-vector T0 is correlated with each of the normalized texture column-vectors $T0_i$ of the corresponding descriptor patches.

In this non-limiting example a correlation measurement $Z_{ncc}$ is used, defined for example by $$Z_{ncc}(T0, T0_i) = {}^t T0 * T0_i \qquad \text{(Eq 18)}$$

(where $^tT0$ designates the transposed vector of the normalized texture column-vector T0). As the sizing of patches $P_l^k$, $P_r^k$ is constant, the normalized texture column-vectors T0, $T0_i$ all have the same size.

Step 236—For each of the patches $P_l^k$, $P_r^k$, this correlation measurement $Z_{ncc}$ is compared against the previously defined correlation threshold threshold. If correlation $Z_{ncc}$ is below the threshold, i.e. $Z_{ncc}(T0^k, T0_i)$<threshold, patch P is added to the eyes database $DB_{models\_eyes}$, with the following data stored:
the normalized texture column-vector $T0^k$,
the precise position of the normalized characteristic points, by applying the similarity $S^k$(tx, ty, s, Θ) to the precise positions of characteristic points identified beforehand in the learning photograph $APP_{eyes}^k$,
the similarity $S^k$(tx, ty, s, Θ)
and other useful information: morphology, brightness etc.

A new learning photograph $APP_{eyes}^{k+1}$ can now be processed by returning to step 230.

Step 240—A statistical operation is performed on all the similarities $S^k$(tx, ty, s, Θ) stored in the database $DB_{models\_eyes}$.

First of all, the mean value of the translation tx and the mean value of the translation ty are calculated; these values will be stored in a two-dimensional vector $\vec{\mu}$.

Secondly, the standard deviation σ is calculated for position parameters tx, ty relative to their mean, characterized by $\vec{\mu}$.

In a variant, the precise positions of the characteristic points of the eyes, (these precise positions here are non-normalized) determined beforehand in the $k^{th}$ learning photograph $APP_{eyes}^k$. The similarity $S^k$(tx, ty, s, Θ) or the values of all the parameters allowing these precise positions to be re-calculated, are also stored.

Phase 300: Method of Searching for Criteria for Recognizing a Face in a Photo.

The purpose of phase 300 is to detect the possible presence of a face in a photo. A boosting algorithm is used, of a type known per se and, for example, described by P. Viola and L. Jones "Rapid object detection using a boosted cascade of features" and improved by R. Lienhart "a detector tree of boosted classifiers for real-time object detection tracking".

It is noted that, in the field of automatic learning, the term classifier refers to a family of statistical classification algorithms. In this definition, a classifier groups together in the same class elements presenting similar properties.

Strong classifier refers to a very precise classifier (low error rate), as opposed to weak classifiers, which are not very precise (slightly better than a random classification).

Without going into details, which are outside the framework of this invention, the principle of boosting algorithms is to use a sufficient number of weak classifiers to make a strong classifier, achieving a desired classification success rate, emerge by selection or combination.

Several boosting algorithms are known. In this example the boosting algorithm known under the brand name "AdaBoost" (Freund and Schapire 1995) is used to create several strong classifiers (e.g. twenty) that will be organized in a cascade, in a manner known per se.

In the case of searching for a face in a photo, if a strong classifier thinks it has detected a face at the analysis level at which it operates with its set of weak classifiers, then it passes the image to the next strong classifier, which is more accurate, less robust but freed from some uncertainties due to the previous strong classifier.

In order to obtain a cascade with good classification properties in an uncontrolled environment (variable lighting conditions, variable locations, substantially variable faces to be detected), it is necessary to establish a face learning database $DBA_{faces}$.

This face learning database $DBA_{faces}$ consists of a set of images referred to as positive examples of faces $Face_{positive}$ (type of example that one wants to detect) and a set of images referred to as negative examples of faces $Face_{negative}$ (type of example that one does not want to detect). These images are advantageously, but not obligatorily, the same size as the images of models of spectacles and of the face of the user in the trying-on method.

To generate the set of images referred to as the positive examples of faces $Face_{positive}$, first of all reference face images $Face_{reference}$ are selected such that:
  these faces are the same size (e.g. one can require the interpupillary distance in the image to be equal to the reference interpupillary distance $di_0$),
  the segment between the centers of the two eyes is horizontal and vertically centered on the image, and
  the orientation of this face is either a front view or slightly in profile, between −45° and 45°.

The set of these reference face images $Face_{reference}$ must comprise several lighting conditions.

Secondly, based on these reference face images $Face_{reference}$, other modified images $Face_{modified}$ are constructed by applying variations in scale, rotation and translation in bounds determined by a normal trying on of a pair of spectacles (e g. unnecessary to create an inverted face).

The set of images referred to as the positive examples of faces $Face_{positive}$ consists of reference face images $Face_{reference}$ and modified images $Face_{modified}$ based on these reference face images $Face_{reference}$. In this example, the number of examples referred to as positive examples of faces $Face_{positive}$ is greater than or equal to five thousand.

The set of images of negative examples of faces $Face_{negative}$ consists of images that cannot be included in the images referred to as positive examples of faces $Face_{positive}$.

These are, therefore, images that do not represent faces, or images representing parts of faces, or faces that have undergone aberrant variations. In this example, a group of pertinent images is taken for each level of the cascade of strong classifiers. For example, five thousand images of negative examples of faces $Face_{negative}$ are selected for each level of cascade. If, as in this example, one chooses to use twenty levels in the cascade, this gives one hundred thousand images of negative examples of faces $Face_{negative}$ in the face learning database $DBA_{faces}$.

Phase 300 uses this face learning database $DBA_{faces}$ to train the first boosting algorithm AD1, designed to be used in step 510 of phase 500.

Phase 400: Method of Searching for Criteria for Recognizing Characteristic Points in a Face The purpose of phase 400 is to provide a method for detecting the position of the eyes in a face in a photo. In this example, the position of the eyes is detected with a second, Adaboost-type, detection algorithm AD2, trained with an eyes learning database $DBA_{eyes}$ described below.

The eyes learning database $DBA_{eyes}$ consists of a set of positive examples of eyes $Eyes_{positive}$ (positive examples of eyes are examples of what one wants to detect) and a set of negative examples of eyes $Eyes_{negative}$ (negative examples of eyes are examples of what one does not want to detect).

To generate the set of images referred to as positive examples of eyes $Eyes_{positive}$, first of all reference eye images $Eyes_{reference}$, are selected such that the eyes are of the same size, straight (aligned horizontally) and centered, under different lighting conditions and in different states (closed, open, half-closed, etc.), Secondly, based on these reference eye images $Eyes_{reference}$, other modified eye images $Eyes_{modified}$ are constructed by applying variations in scale, rotation and translation in limited bounds.

The set of images referred to as the positive examples of eyes $Eyes_{positive}$ will therefore consist of reference eye images $Eyes_{reference}$ and modified eye images $Eyes_{modified}$ based on these reference eye images $Eyes_{reference}$. In this example, the number of examples referred to as positive examples of eyes $Eyes_{positive}$ is greater than or equal to five thousand.

The set of images of negative examples of eyes $Eyes_{negative}$ must be constituted of images of parts of the face that are not eyes (nose, mouth, cheek, forehead, etc.) or of partial eyes (bits of the eye).

To increase the number and pertinence of the negative examples of eyes $Eyes_{negative}$, additional negative images are constructed based on reference eye images $Eyes_{reference}$ by applying sufficiently great variations in scale, rotation and translation so that these images thus created are not interesting in the context of images of positive examples of eyes $Eyes_{positive}$.

A group of pertinent images is selected for each level of the cascade of strong classifiers. For example, five thousand images of negative examples of eyes $Eyes_{negative}$ can be selected for each level of cascade. If there are twenty levels in the cascade, this gives one hundred thousand images of negative examples of eyes $Eyes_{negative}$ in the eyes learning database $DBA_{eyes}$.

Phase 400 may use this eyes learning database $DBA_{eyes}$ to train a second boosting algorithm AD2, which is used in a variant of the method involving a step 520.

Phase 500 of Trying on Virtual Spectacles

In phase 500, trying on virtual spectacles, the method of generating a final image 5 from the original photo is divided into seven steps:
  a step 510 of detecting the face 2 of the subject in an original photo 1.
  possibly a step 520 of the preliminary determination of the position of characteristic points of the subject in the original photo 1.
  a step 530 of determining the position of characteristic points of the subject in the original photo 1.

a step 540 of determining the 3D orientation of the face 2.

a step 550 of selecting the texture to be used for the virtual pair of spectacles 3 and generating the view of the spectacles in the 3D/2D position in question.

a step 560 of creating a first rendering 28 by establishing a layered rendering in the correct position consistent with the position of the face 2 in the original photo 1.

a step 570 of obtaining the photorealistic rendering by adding overlays, referred to as semantic overlays, so as to obtain the final image 5.

Step 510: In this example step 510 uses the first boosting algorithm AD1 trained in phase 300 to determine whether the original photo 1 contains a face 2. If this is the case one goes to step 520, otherwise the user is warned that no face has been detected.

Step 520: its purpose is to detect the position of the eyes in the face 2 in the original photo 1. Step 520 here uses the second boosting algorithm AD2 trained in phase 400.

The position of the eyes, determined in this step 520, is expressed by the position of characteristic points. This step 520 thus provides a first approximation, which is refined in the next step 530.

Step 530: it consists of determining a similarity β, to be applied to an original photo 1, to obtain a face, similar to a reference face 7 in magnification and orientation, and determining the position of the precise exterior corner A and the precise interior corner B for each eye in the face 2 in the original photo 1.

The position of the eyes, determined in this step 530, is expressed by the position of characteristic points. As explained above, these characteristic points comprise two points per eye; the first point is defined by the most innermost possible corner A of the eye (the one nearest the nose), the second point B is the most outermost corner of the eye (the one furthest from the nose). The first point, A, is called the interior point of the eye, and the second point, B, is called the exterior point of the eye.

This step 530 uses the database of models of eyes $DB_{models\_eyes}$. In addition this step 530 provides information characterizing the offset from center, distance to the camera and 2D orientation of the face 2 in the original photo 1.

This step 530 uses an iterative algorithm that makes it possible to refine the value of the similarity β and the positions of the characteristic points.

The parameters of similarity β and the positions of the characteristic points are initialized as follows. Step 520 has provided respectively, for each eye, a first approximate exterior point of the eye $A_0$ and a first approximate interior point $B_0$; these points are used for initializing the characteristic points. The initialization values of the similarity β are deduced from them.

The similarity β is defined by a translation tx, ty in two dimensions x, y, a parameter of scale s and a parameter of rotation θ in the image plane. This therefore gives $$\beta_0 = \begin{pmatrix} x_0 \\ y_0 \\ \theta_0 \\ s_0 \end{pmatrix},$$

the initial value of β.

The different steps of an iteration are as follows:

The characteristic points are used to create the two patches $P_l$, $P_r$ containing the two eyes. These patches $P_l$, $P_r$ are created as follows;

The original photo 1 is transformed into a gray-scale image 8, by an algorithm known per se, and the two patches $P_l$, $P_r$ are constructed with the information about the exterior B and interior A points.

The position of a patch $P_l$, $P_r$ is defined by the fixed distance D, used prior to this in step 232 and following steps, between the exterior edge B of the eye and the edge of the patch closest to this point B. The sizing of the patch $P_l$, $P_r$ (width and height) was defined in step 232 and following steps. If the patches $P_l$, $P_r$ are not horizontal (external and interior points of the patch not aligned horizontally), a bilinear interpolation of a type known per se, is used to align them.

The information about the texture of each of the two patches $P_l$, $P_r$ is stored in a vector ($T_l$), then these two vectors are normalized by subtracting their respective mean and dividing by their standard deviation. This gives two normalized vectors, designated $T0_r$ and $T0_l$.

The realization of β is considered in terms of probability. The realizations of the parameters of position tx, ty, orientation Θ, and scale s, are considered to be independent and, in addition, the distributions of Θ, s are considered to follow a uniform distribution.

Finally, the parameters of position tx, ty are considered to follow a Gaussian distribution with mean vector $\vec{\mu}$ (in two dimensions) and standard deviation σ. The probability that β is realized is designated by p(β). Taking the variables $\vec{\mu}$, σ and $$\vec{v} = \begin{pmatrix} x \\ y \end{pmatrix},$$

stored in the eyes database $DB_{models\_eyes}$, and established in step 240, an optimization criterion is selected as follows:

$$\arg\max_{x,y,z,\theta,s} \ln p(\beta/D) = \qquad\qquad\text{(Eq 19)}$$
$$\arg\max(\ln p(D_r/\beta), \ln p(D_l/\beta)) - K\frac{\|\vec{v} - \vec{\mu}\|^2}{2\sigma^2}$$

where $D_r$ are random variable data representing the right patch $P_r$, consisting of the texture of the right patch, $D_l$ are random variable data representing the left patch $P_l$, consisting of the texture of the left patch, $D = D_r \cup D_l$ are random variable data representing the two patches $P_l$, $P_r$. The realizations of $D_r$ and $D_l$ are considered to be independent, p(β/D) is the probability β is realized given D, K is a constant, $p(D_r/\beta) = \max \rho(D_r/\beta, \text{id})$ id represents a descriptor patch (patches stored in the eyes database $DB_{models\_eyes}$)

The set of descriptor patches in the eyes database $DB_{models\_eyes}$ are then scanned. The term p represents the correlation $Z_{ncc}$ (between 0 and 1), formulated in step 235 and following steps, between patch $P_r$ of the right eye (respectively $P_l$ of the left eye) and a descriptor patch transformed according to the similarity β.

The maximum of these correlations $Z_{ncc}$ allows the probabilities $p(D_l/\beta)$ (respectively $p(D_r/\beta)$) to be calculated.

The regulation term $$-K\frac{\|\vec{v}-\vec{\mu}\|^2}{2\sigma^2}$$

makes it possible to ensure the physical validity of the proposed solution.

The optimization criterion defined above (Equation 19), thus makes it possible to define an optimal similarity $\beta$ and an optimal patch from the patch descriptors for each of the two patches $P_l$, $P_r$, which allows new estimates of the position of the exterior corners A and interior point B of each eye, i.e. characteristic points, to be provided.

It is tested whether this new similarity value $\beta$ is sufficiently far from the previous value, e.g. by a difference of $\epsilon$: if $\|\beta_{i-1}-\beta_i\|>\epsilon$ an iteration is repeated. In this iteration, $\beta_i$ represents the value of $\beta$ found at the end of the current iteration and $\beta_{i-1}$ is the value of similarity $\beta$ found at the end of the previous iteration, i.e. also the initial value of similarity $\beta$ for the current iteration.

The constant K allows the right compromise to be achieved between the correlation measurements Zncc and a mean position from which one does not want to depart too far.

This constant K is calculated, using the method just described, on a set of test images, different from the images used to create the database, and by varying K.

It is understood that the constant K is chosen so as to minimize the distance between the characteristic points of the eyes, manually positioned on the training images, and those found in step 530.

Step 540: its purpose is to estimate the 3D orientation of the face, i.e. to provide the angle $\phi$ and angle $\psi$ of the camera having taken the photo 1, relative to the principal plane of the face. These angles are calculated from the precise position 38 of the characteristic points determined in step 530, by a geometric transformation known per se.

Step 550: this step consists of:
firstly, 1/ finding the simplified geometric model 6 of the model of a virtual pair of spectacles 3, stored in the spectacles database $DB_{models\_spectacles}$, and, 2/ applying to it the reference orientation Orientation$^i$ closest to angles $\phi$ and $\psi$ (determined in step 540),
secondly, 3/ assigning a texture to the simplified geometric model 6, positioned in the 3D orientation of the reference orientation Orientation$^i$ closest to angles $\phi$ and $\psi$, using the texture of the reference orientation Orientation$^i$ closest to these angles $\phi$ and $\psi$. This is equivalent to texturing each of the N surfaces surface$_j$ of the simplified geometric model 6 while classifying the surface in the current view into three classifications: interior surface of the frame, exterior frame of the frame, lens.

It is noted that the simplified geometric model 6 is divided into N surfaces surface$_j$, each having a normal $\vec{n}_j$. This texture calculation is performed as follows, using the texture, i.e. the different overlays, of the reference orientation Orientation$^i$ closest to angles $\phi$ and $\psi$:

inversion of the normals $\vec{n}_j$ of each of the surfaces surface$_j$ and projection of the frame overlay Frame$^i$, limited to the lens space of the reference orientation Orientation$^i$ closest to angles $\phi$ and $\psi$. Designating by proj $\perp$ (image, $\vec{n}$) the operator of the orthogonal projection of an image on a 3D surface of normal $\vec{n}$ in a given position, gives:

$$\text{Texture}_{surface}(-\vec{n}) = \text{proj} \perp (\text{Frame}^i \otimes \text{Lens}^i_{binary}, -\vec{n})\perp \quad \text{(Eq 20)}$$

This gives a texture overlay of the internal surface of the frame TextureFrame$^i_{surface\_interior}$. This overlay TextureFrame$^i_{surface\_interior}$ makes it possible to structure (i.e. determine an image) the arms of the frame 4a, seen through the lens 4b in the textured reference model 9 (superimposition of texture overlays of the pair of spectacles corresponding to a reference orientation), oriented according to the reference orientation Orientation$^i$ closest to angles $\phi$ and $\psi$.

projection of the frame overlay Frame$^i$, limited to the space outside the lens of the reference orientation Orientation$^i$ closest to angles $\phi$ and $\psi$. This is expressed by:

$$\text{Texture}_{surface}(\vec{n}) = \text{proj} \perp (\text{Frame}^i \otimes (1-\text{Lens}^i_{binary}),\vec{n}) \quad \text{(Eq 21)}$$

This gives a texture overlay of the exterior surface of the frame TextureFrame$^i_{surface\_exterior}$ which makes it possible to structure the surfaces outside the lens 4b of the frame 4a, in the textured reference model 9, oriented according to the reference orientation Orientation$^i$, closest to angles $\phi$ and $\psi$.

projection of the lens overlay limited to the lens. This is expressed by:

$$\text{Texture}_{surface}(-\vec{n}) = \text{proj} \perp (\text{Lens}^i \otimes \text{Lens}^i_{binary}, \vec{n}) \quad \text{(Eq 22)}$$

This gives a lens texture overlay TextureLens$^i$ that makes it possible to structure the lens 4b, in the textured reference model 9, oriented according to the reference orientation Orientation$^i$, closest to angles $\phi$ and $\psi$.

Step 560 consist of generating an oriented textured model 11, oriented according to the angles $\phi$ and $\psi$ and according to the scale and orientation of the original photo 1 (which can have any value and not necessarily equal to the angles of the reference orientations), from the textured reference model 9, oriented according to the reference orientation Orientation$^i$, closest to angles $\phi$ and $\psi$, and parameters $\Theta$ and s of similarity $\beta$ (determined in step 530).

Firstly, a bilinear affine interpolation is used to orient an interpolated textured model 10 according to the angles $\phi$ and $\psi$ (determined in step 540) based on the textured reference model 9 (determined in step 550) oriented according to the reference orientation Orientation$^i$ closest to these angles $\phi$ and $\psi$.

Secondly, the similarity $\beta$ to be applied is used, so as to obtain the same scale, the same (2D) image orientation and the same centering as the original photo 1. This gives an oriented textured model 11.

Thirdly, the arms of the virtual spectacles 3 are varied geometrically according to the morphology of the face of the original photo 1.

Thus, at the end of step 560, a spectacles overlay Spectacles$_{overlay}$ of the virtual pair of spectacles 3 is obtained and a binary overlay Spectacles$_{overlay\_binary}$ (outline shape of this spectacles overlay) is deduced, oriented as the original photo 1, and which can therefore be superimposed on it.

Figure 9:
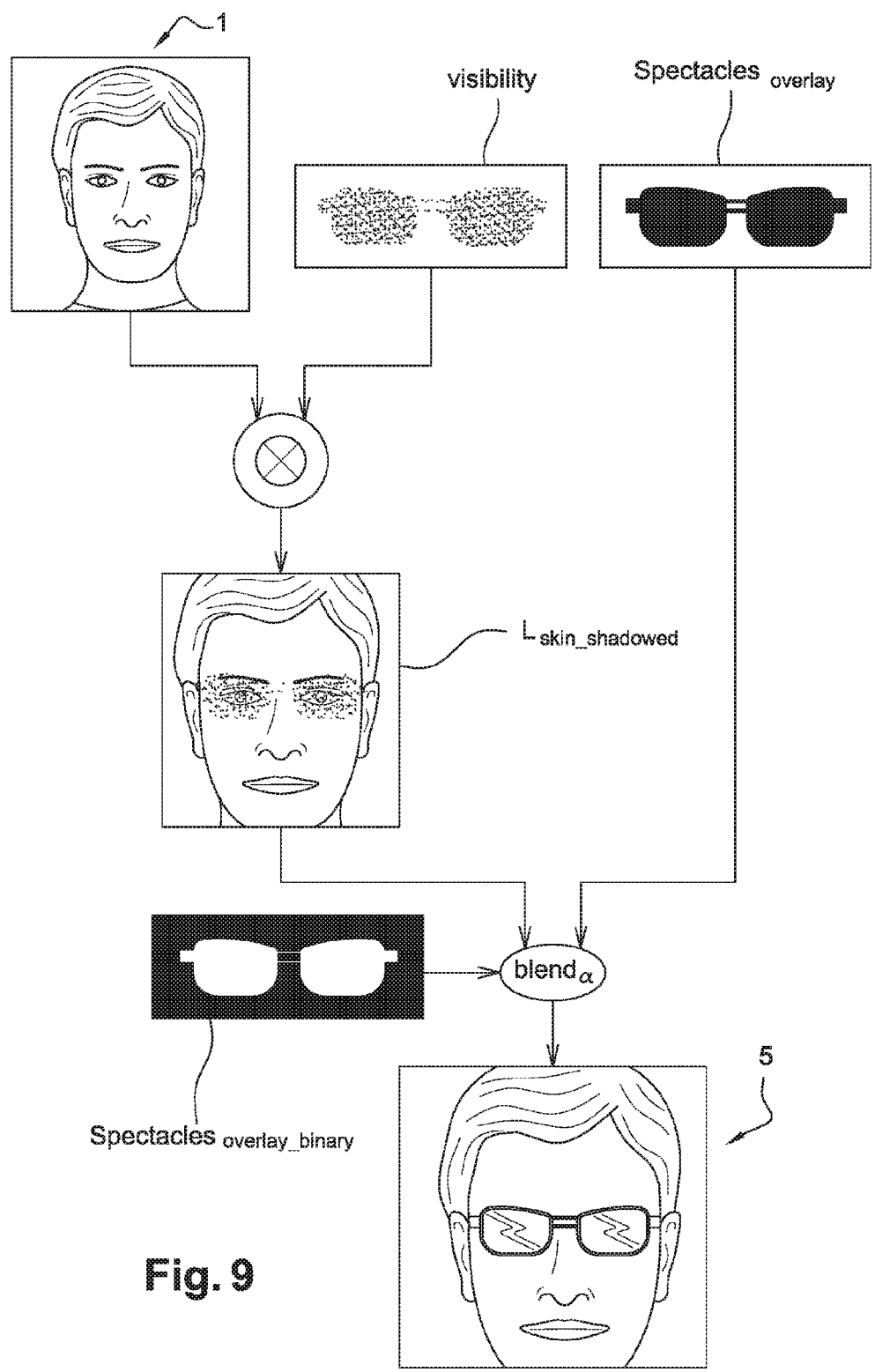
FIG. 9 is a schematic of the construction of the final image.

Step 570 consists of taking into account the light interactions due to wearing virtual spectacles, i.e. taking into account, for example, the shadows cast onto the face 2, the visibility of the skin through the lens of the spectacles, the reflection of the environment on the spectacles. It is described in FIG. 9. It consists of:

1) multiplying the shadow map Visibility$^j$ (obtained in step 140) and the photo 1 to obtain a shadowed photo overlay, designated $L_{skin\_Shadowed}$. Designating the original photo 1 by Photo this gives:

$$L_{skin\_Shadowed} = \text{Visibility}^j \otimes \text{Photo} \qquad (Eq\ 23)$$

2) "blending" the shadowed photo overlay $L_{skin\_Shadowed}$ and the spectacles overlay Spectacles$_{overlay}$ by linear interpolation, depending on the coefficient of opacity a of the lens 4b in an area limited to the binary overlay Spectacles$_{overlay\_binary}$ of the virtual pair of spectacles 3, to obtain the final image 5.

Where $C_x$ and $C_y$ are any two overlays, a blend$_\alpha$ function is defined by:

$$\text{blend}_\alpha(C_x, C_y) = \alpha * C_x + (1-\alpha) * C_y \qquad (Eq\ 24)$$

where α is the coefficient of opacity of the lens 4b stored in the spectacles database DB$_{models\_spectacles}$ This function is therefore applied where
$C_x$=spectacles overlay Spectacles$_{overlay}$
$C_y$=shadowed photo overlay $L_{skin\_Shadowed}$
and only in the area of the spectacles determined by the binary overlay Spectacles$_{overlay\_binary}$.

The result of this function is an image of the original photo 1 on which is superimposed an image of the model of spectacles chosen, oriented as the original photo 1, and given shadow properties.

Variants of the Invention

In a variant, the construction procedure allowing the simplified geometrical model 6 of a new shape of a real pair of spectacles 4, i.e. of a shape not found in the models database DB$_{models\_spectacles}$ to be constructed, is here as follows:

this real pair of spectacles 4 is made non-reflective. For example, to achieve this penetrant powder is used, of a type known per se, used in the mechanical and aeronautical industries to detect faults in parts manufactured. This powder is deposited by known means on the frame 4a and the lenses 4b to make the whole matte, opaque and therefore not reflective.

the geometry of this matte, opaque real pair of spectacles 4 is established, for example, by means of a scanner using lasers or so-called structured light. The real pair of spectacles 4 generally has a greater depth than the depth of field accepted by these current types of scanners. Therefore, several scans of parts of this real pair of spectacles 4 are assembled, by conventional techniques, from images based, for example, on physical reference points. In this example, these physical reference points are created using watercolors on the penetrant powder deposited on the real pair of spectacles 4.

In yet another variant, step 540, whose purpose is to estimate the 3D orientation of the face, proceeds by detecting, if possible, the two points on the image representing the temples, called temple image points 63.

The visual characteristic of a temple point is the visual meeting of the cheek and ear.

The detection of temple image points 63 may fail in the case where, for example, the face is turned sufficiently (>fifteen degrees), or there is hair in front of the temples etc. The failure to detect a temple image point 63 can be classified into two causes:

first cause: the temple image point 63 is hidden by the face 2 itself because the orientation of the latter makes it not visible second cause: the temple image point 63 is hidden by something other than the morphology, most often the hair.

Step 540 here uses segmentation tools that also, if detection of a temple image point 63 fails, allow the class of failure cause to which the image belongs to be determined.

Step 540 comprises a method for deciding whether or not to use the temples image point or points 63, according to a previously stored decision criterion.

If this criterion is not fulfilled, angle φ and angle ψ are considered to be zero. Otherwise, angle φ and angle ψ are calculated from the position of the temple image point or points 63 detected, and the precise position 38 of the characteristic points determined in step 530.

It is understood that the description just given for images of pairs of spectacles to be placed on an image of a face in real time applies, with modifications in the reach of the expert, to similar problems, for example presenting a model of a hat on the face of a user.

The invention claimed is:

1. A method for generating a simplified geometric model comprising a frame and lenses of a real pair of spectacles, the simplified geometric comprises a predefined number of surfaces and normals thereof, taking as an orientation of these normals an exterior of a convex envelop to the real pair of spectacles, the simplified geometric model been obtained in a phase in which:
    a set of views of the real pair of spectacles to be modeled is produced, with different angles-of-view and using different screen backgrounds with and without the real pair of spectacles, images of the real pair of spectacles are obtained at high resolution according to V different reference orientations;
    the simplified geometric model is constructed, consisting of the predefined number of surfaces and their normal beginning with a non-dense surface mesh and using an optimization algorithm that deforms the model's mesh so that projections of its silhouette in each of the views best match the silhouettes detected in the images; and
    wherein the number V of reference orientations is at least equal to nine.

2. The method according to claim 1, wherein the predefined number of surfaces of the simplified geometric model is a value close to twenty.

3. The method according to claim 1, wherein the V*N high-resolution images of the real pair of spectacles are obtained, the lens matching the lens intended for trying on, the real pair of spectacles is photographed at high resolution according to the V different reference orientations and in N light configurations showing the transmission and reflection of the lens of the spectacles, these reference orientations are selected by discretizing a spectrum of orientations corresponding to possible orientations when spectacles are tried on.

4. The method according to claim 3, wherein an orthogonal reference space with axes x, y, z is defined, where the y-axis corresponds to a vertical axis, ψ to an angle of rotation around the x-axis, φ to an angle of rotation around the y-axis, the V reference orientations selected are such that the angle ψ substantially takes the respective values −16°, 0° or 16°, and the angle φ takes the respective values −16°, 0° or 16°.

5. The method according to claim 4, further comprising the step of performing a texture calculation using overlays associated to a reference orientation closest to angles φ and ψ, by the following sub-steps:
    inversion of the normals of each of the surfaces of the pair of spectacles modeled and projection of the frame overlay, limited to the lens space of the reference orientation closest to angles φ and ψ, to obtain a texture overlay of an internal surface of the frame to structure arms of the frame seen through the lens, in a textured reference model, oriented according to the reference orientation closest to angles φ and ψ;

projection of the frame overlay, limited to the space outside the lens of the reference orientation closest to angles φ and ψ, to obtain a texture overlay of the external surface of the frame to structure the surfaces of the frame outside the lens, in the textured reference model, oriented according to the reference orientation closest to angles φ and ψ; and projection of the lens overlay limited to the lens to obtain a lens texture overlay to structure the lens, in the textured reference model, oriented according to the reference orientation closest to angles φ and ψ.

6. The method according to claim 3, wherein:

a first light configuration respects colors and materials of the real pair of spectacles, using neutral light conditions, V high-resolution transmission images generated in the first light configuration allow a maximum transmission of light through the lenses to be revealed; and a second light configuration highlights geometric characteristics of the real pair of spectacles using conditions of intense reflection, V high-resolution reflection images obtained in the second light configuration reveal physical reflection properties of the lens.

7. The method according to claim 3, wherein the phase comprises a step of generating a texture overlay of the frame for each of the V reference orientations.

8. The method according to claim 7, wherein in the step of generating the texture overlay: for each of the V reference orientations, a high-resolution reflection image is taken, and a binary image is generated with a same resolution as the high-resolution reflection image, the binary image is called the lens silhouette or a binary overlay of the lens and a value of a pixel is equal to one for the pixel representing the lenses and zero otherwise in the lens silhouette.

9. The method according to claim 8, wherein a shape of the lenses needed to generate the lens silhouette is extracted using an active contours algorithm based on an assumption that the frame and the lenses have different transparencies.

10. The method according to claim 8, wherein in the step of generating texture overlay:

a lens overlay is generated for each of the reference orientations by copying, for each pixel with a value equal to one in the binary overlay of the lens, information contained in the high-resolution reflection image and assigning zero to the other pixels;

the lens overlay is a high-definition cropped image of the lens using, for cropping an original high-definition image, the lens silhouette;

an associated high-resolution reflection image is selected for each of the reference orientations, and a binary background image is generated by automatically extracting a background;

a binary image is generated from a binary overlay of the frame by deducting from a neutral image an outline image of the lenses and an outline image of the background;

a texture overlay of the frame behind the lens with a texture of the frame corresponding to a portion of the frame located behind the lenses is generated for each of the reference orientations by copying, for each pixel with a value equal to one in the binary lens overlay, information contained in the high-resolution transmission image, and assigning zero to the other pixels;

a texture overlay of the frame outside the lens is generated by copying, for each pixel with a value equal to one in the binary frame overlay, information contained in the high-resolution reflection image, and assigning zero to the other pixels; and an overlay of the texture of the frame is defined as the sum of the overlay of the texture of the frame behind the lens and the overlay of the texture of the frame outside the lens.

* * * * *